(12) United States Patent
Seitz

(10) Patent No.: US 10,376,097 B1
(45) Date of Patent: Aug. 13, 2019

(54) CLAMSHELL GRIDDLE WITH ADJUSTABLE UPPER PLATEN

(71) Applicant: AccuTemp Products, Inc., Fort Wayne, IN (US)

(72) Inventor: Gary L. Seitz, Decatur, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 660 days.

(21) Appl. No.: 14/988,612

(22) Filed: Jan. 5, 2016

Related U.S. Application Data

(60) Provisional application No. 62/100,304, filed on Jan. 6, 2015, provisional application No. 62/128,834, filed on Mar. 5, 2015, provisional application No. 62/157,361, filed on May 5, 2015.

(51) Int. Cl.
*A47J 37/06* (2006.01)

(52) U.S. Cl.
CPC .... *A47J 37/0611* (2013.01); *A47J 2037/0617* (2013.01)

(58) Field of Classification Search
CPC ................ A47J 37/0611; A47J 2037/0617
USPC ................ 99/331, 372, 374, 377, 379, 380; 100/254, 255, 258 A, 269.12
See application file for complete search history.

(56) References Cited

U.S. PATENT DOCUMENTS

| 4,763,571 A | 8/1988 | Bergling et al. |
| RE32,994 E | 7/1989 | Adamson et al. |
| 4,852,545 A | 8/1989 | Sherman et al. |
| 4,913,040 A | 4/1990 | Sherman et al. |
| 5,640,895 A | 6/1997 | Anetsberger |
| 5,755,150 A | 5/1998 | Matsumoto et al. |
| 5,791,234 A | 8/1998 | Newton et al. |
| 5,910,207 A | 6/1999 | Newton et al. |

(Continued)

FOREIGN PATENT DOCUMENTS

| JP | 10309236 | 11/1998 |
| WO | 9746151 | 12/1997 |
| WO | 2007127072 | 11/2007 |

*Primary Examiner* — Dana Ross
*Assistant Examiner* — James F Sims, III
(74) *Attorney, Agent, or Firm* — Faegre Baker Daniels LLP

(57) ABSTRACT

A vertically adjustable upper platen is useable with, e.g., a clamshell-type steam griddle, in which the vertical position of the upper cooking surface can be precisely and repeatably controlled. The upper platen includes a vertical adjustment mechanism which utilizes multiple mechanical reductions to facilitate rapid and precise adjustments of the vertical platen position in small increments, while retaining traditional and cost-effective control mechanisms and motors. The vertically adjustable platen may also include a leveler assembly which allows the upper platen to self-adjust into a level orientation relative to the lower platen when the upper platen is lowered into contact with the lower platen, and then hold the level orientation when the upper platen is raised to create a cooking space between the upper and lower cooking surfaces. The steam griddle may further include a counterweight system functionally connected at a pivot connection between the moveable upper platen assembly and the stationary lower platen assembly, which is operable to automatically pivot the upper platen assembly into its open configuration and selectively hold the upper platen assembly in its closed configuration.

25 Claims, 20 Drawing Sheets

(56) References Cited

U.S. PATENT DOCUMENTS

| | | | |
|---|---|---|---|
| 5,918,588 | A | 7/1999 | Gil Garcia |
| 5,934,182 | A | 8/1999 | Harter et al. |
| 6,016,743 | A | 1/2000 | Glavan |
| 6,079,321 | A | 6/2000 | Harter et al. |
| 6,739,242 | B2 | 5/2004 | Patenotre et al. |
| 7,878,109 | B2 | 2/2011 | Calzada et al. |
| 7,913,615 | B2 | 3/2011 | Calzada et al. |
| 7,954,422 | B2 | 6/2011 | Nevarez et al. |
| 8,109,202 | B2 | 2/2012 | Nevarez et al. |
| 8,210,100 | B2 | 7/2012 | Nevarez et al. |
| 8,359,970 | B2 | 1/2013 | Calzada et al. |
| 8,474,370 | B2 | 7/2013 | Nevarez et al. |
| 8,555,777 | B2 | 10/2013 | Calzada et al. |
| 8,763,519 | B2 * | 7/2014 | Ricchio ................ A47J 37/0611 219/525 |
| 8,833,243 | B2 | 9/2014 | Sands et al. |
| 8,863,652 | B2 | 10/2014 | Nevarez et al. |
| 2005/0193897 | A1 | 9/2005 | Nevarez et al. |
| 2012/0100270 | A1 | 4/2012 | Nevarez et al. |
| 2013/0071534 | A1 | 3/2013 | Newton |
| 2014/0023755 | A1 | 1/2014 | Claesson et al. |
| 2014/0026764 | A1 * | 1/2014 | Sykes .................... A47J 37/06 99/349 |
| 2014/0033930 | A1 | 2/2014 | Calzada et al. |
| 2014/0123861 | A1 | 5/2014 | Cooper et al. |
| 2015/0108110 | A1 * | 4/2015 | Freymiller ........... A47J 37/0611 219/448.13 |

\* cited by examiner

CLAMSHELL GRIDDLE WITH ADJUSTABLE UPPER PLATEN

CROSS REFERENCE TO RELATED APPLICATIONS

The present application claims the benefit under Title 35, U.S.C. Section 119(e) of U.S. Provisional Patent Application Ser. No. 62/100,304 filed Jan. 6, 2015 and entitled UPPER PLATEN WITH HEIGHT ADJUSTMENT FOR CLAMSHELL GRILL, U.S. Provisional Patent Application Ser. No. 62/128,834 filed Mar. 5, 2015 and entitled UPPER PLATEN WITH HEIGHT ADJUSTMENT FOR CLAMSHELL GRILL and U.S. Provisional Patent Application Ser. No. 62/157,361 filed May 5, 2015 and entitled AUTO CALIBRATION OF UPPER PLATEN WITH HEIGHT ADJUSTMENT FOR CLAMSHELL GRILL, the entire disclosures of which are all hereby expressly incorporated herein by reference.

BACKGROUND

1. Technical Field

The present disclosure is directed to griddle cooking devices and, in particular, to adjustable clamshell-type cooking devices.

2. Description of the Related Art

Cooking appliances designed for high throughput of foods prepared on a griddle are common in the restaurant industry. One type of high-throughput griddle is known as a "clam shell" griddle, which has a lower heated platen providing a lower cooking surface, and an upper heated platen providing an opposed upper cooking surface. Such cooking devices may include heaters below the lower platen and above the upper platen, such that food positioned between the upper and lower platens and can be cooked from both sides. The upper platen is lowered into a cooking position, in which the upper platen heated surface is spaced away from the lower platen heated surface by a desired distance. The food contained between the platens is then cooked from both the top and the bottom. When the food is done cooking, the upper platen is raised and the food is removed.

Some clamshell griddles use a hinged upper platen, which can be raised and lowered by pivoting the upper platen about the hinge, so as to bring a top cooking surface into proximity with the food product to be cooked. In some cases, such hinges may be designed to produce and/or maintain a desired distance between the top cooking surface and a particular food product, such that the top cooking surface transmits a desired amount of heat energy to the food while preventing the full weight of the upper platen from crushing the food. In some designs, the upper platen is vertically adjustable (e.g., electronically) to adjust for various thicknesses of foodstuffs. Examples of such devices are found in U.S. Pat. Nos. 5,791,234; 5,910,207 and 6,016,743, the disclosures of which are hereby incorporated by reference herein in their entireties.

What is needed is an improvement over the foregoing.

SUMMARY

The present disclosure provides a vertically adjustable upper platen useable with, e.g., a clamshell-type steam griddle, in which the vertical position of the upper cooking surface can be precisely and repeatably controlled. The upper platen includes a vertical adjustment mechanism which utilizes multiple mechanical reductions to facilitate rapid and precise adjustments of the vertical platen position in small increments, while retaining traditional and cost-effective control mechanisms and motors. The vertically adjustable platen may also include a leveler assembly which allows the upper platen to self-adjust into a level orientation relative to the lower platen when the upper platen is lowered into contact with the lower platen, and then hold the level orientation when the upper platen is raised to create a cooking space between the upper and lower cooking surfaces. The steam griddle may further include a counter-weight system functionally connected at a pivot connection between the moveable upper platen assembly and the stationary lower platen assembly, which is operable to automatically pivot the upper platen assembly into its open configuration and selectively hold the upper platen assembly in its closed configuration.

In one form thereof, the present disclosure provides a vertically adjustable an upper platen assembly for a cooking appliance, the upper platen assembly including: a mainstay; at least one heater moveably coupled to the mainstay, the heater moveable into a plurality of vertical positions between a raised configuration in which the at least one heater is adjacent the mainstay, and a lowered configuration in which the at least one heater is spaced from the mainstay; and a motor fixed to the mainstay and functionally coupled to the at least one heater via a plurality of mechanical reductions, whereby the motor provides precise adjustment of the plurality of vertical positions.

In another form thereof, the present disclosure provides a cooking appliance including: a lower platen having a lower platen cooking surface; and an upper platen assembly having an upper platen cooking surface opposed to and spaced from the lower platen cooking surface to define a vertical gap therebetween, the upper platen assembly comprising: a mainstay; an upper platen defining the upper platen cooking surface and moveably coupled to the mainstay, the upper platen moveable relative to the mainstay into a plurality of vertical positions between a raised configuration in which the vertical gap is at a maximum desired size, and a lowered configuration in which the vertical gap is at a minimum desired size; and a motor fixed to the mainstay and functionally coupled to the upper platen via a plurality of mechanical reductions, such that one full rotation of the motor adjusts a size of the vertical gap by between 0.0005-inches and 0.007-inches.

In yet another form thereof, the present disclosure provides a cooking appliance including: a lower platen having a lower platen cooking surface; and an upper platen assembly having an upper platen cooking surface opposed to and spaced from the lower platen cooking surface to define a vertical gap therebetween, the upper platen assembly comprising: a mainstay; a cross member vertically moveable with respect to the mainstay into a raised position and a lowered position, the cross member extending laterally outwardly away from the mainstay and having a bore formed vertically therethrough at a lateral outward end portion of the cross member; a tie rod coupled to the cross member at the bore; at least one heater vertically suspended from the cross member by the tie rod, such that the at least one heater is vertically moveable with the cross member; a leveler assembly disposed at a junction between the cross member and the tie rod. The leveler assembly includes: a latch lever having an aperture, an actuator positioned laterally inward of the aperture, and a pivot portion positioned laterally outward of the aperture; and a sleeve extending through the bore of the cross member with a tight clearance such that a longitudinal axis of the sleeve is fixed in a substantially coaxial relationship with a longitudinal axis of the bore, the sleeve also extending through the aperture of the latch lever with a loose clearance such that the longitudinal axis of the aperture of the latch lever is skewable with respect to a longitudinal axis of the sleeve. The actuator of the latch lever is biased into a downwardly pivoted position when the cross member is in the raised position, such that the aperture of the latch lever is skewed into a frictionally fixed contact with the sleeve. The actuator of the latch lever is urged into an upwardly pivoted position when the cross member is in the lowered position, such that the sleeve is sufficiently frictionally disengaged with the aperture of the latch lever to allow axial movement of the sleeve with respect to the latch lever and the cross member.

In still another form thereof, the present disclosure provides a cooking appliance including: a lower platen having a lower platen cooking surface; and an upper platen assembly having an upper platen cooking surface, the upper platen assembly defining a closed configuration in which the upper platen cooking surface is opposed to and spaced from the lower platen cooking surface to define a vertical gap therebetween, and an open configuration in which the upper platen assembly is pivoted away from the lower platen, and a counterweight system. The upper platen assembly includes: a hinge rotatably connected to the lower platen; an upper platen extending proximally from the hinge; and a counterweight extension extending distally from the hinge. The counterweight system includes: an actuator fixed to the lower platen and coupled to the counterweight extension, the linear actuator providing a downward force on the counterweight extension sufficient to pivot the upper platen assembly from the closed configuration to the open configuration; and an electric actuator fixed to the lower platen and coupled to the counterweight extension, the electric actuator providing an upward force on the counterweight extension sufficient to urge the upper platen assembly toward the closed configuration in opposition to the downward force of the linear actuator.

BRIEF DESCRIPTION OF THE DRAWINGS

The above-mentioned and other features and advantages of this disclosure, and the manner of attaining them, will become more apparent and the invention itself will be better understood by reference to the following description of an embodiment of the invention taken in conjunction with the accompanying drawings, wherein.

Figure 1:
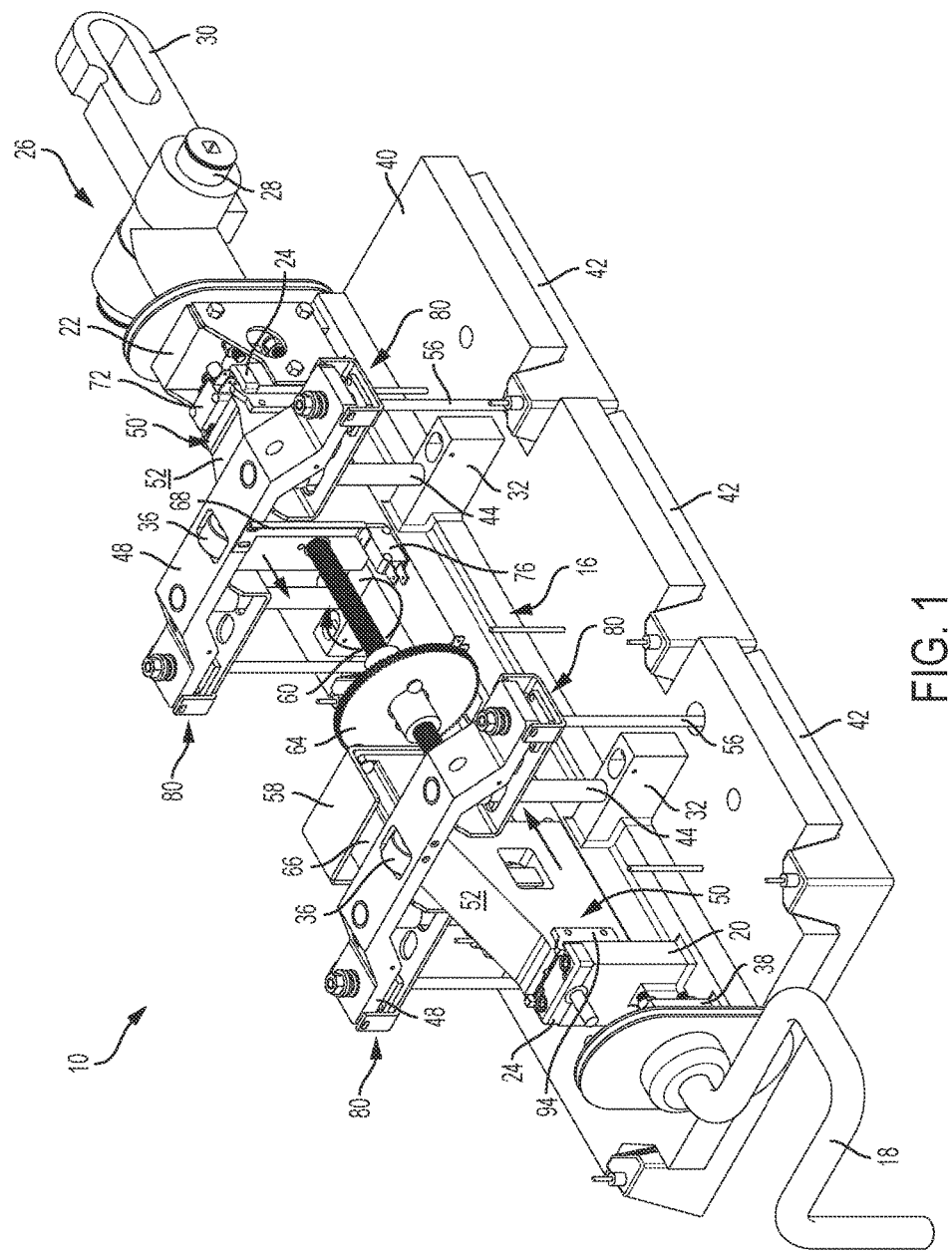
FIG. 1 is a perspective view of an upper platen assembly made in accordance with the present disclosure, illustrating vertically adjustable heaters in a fully raised configuration.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

DETAILED DESCRIPTION

1. Introduction

Figure 11:
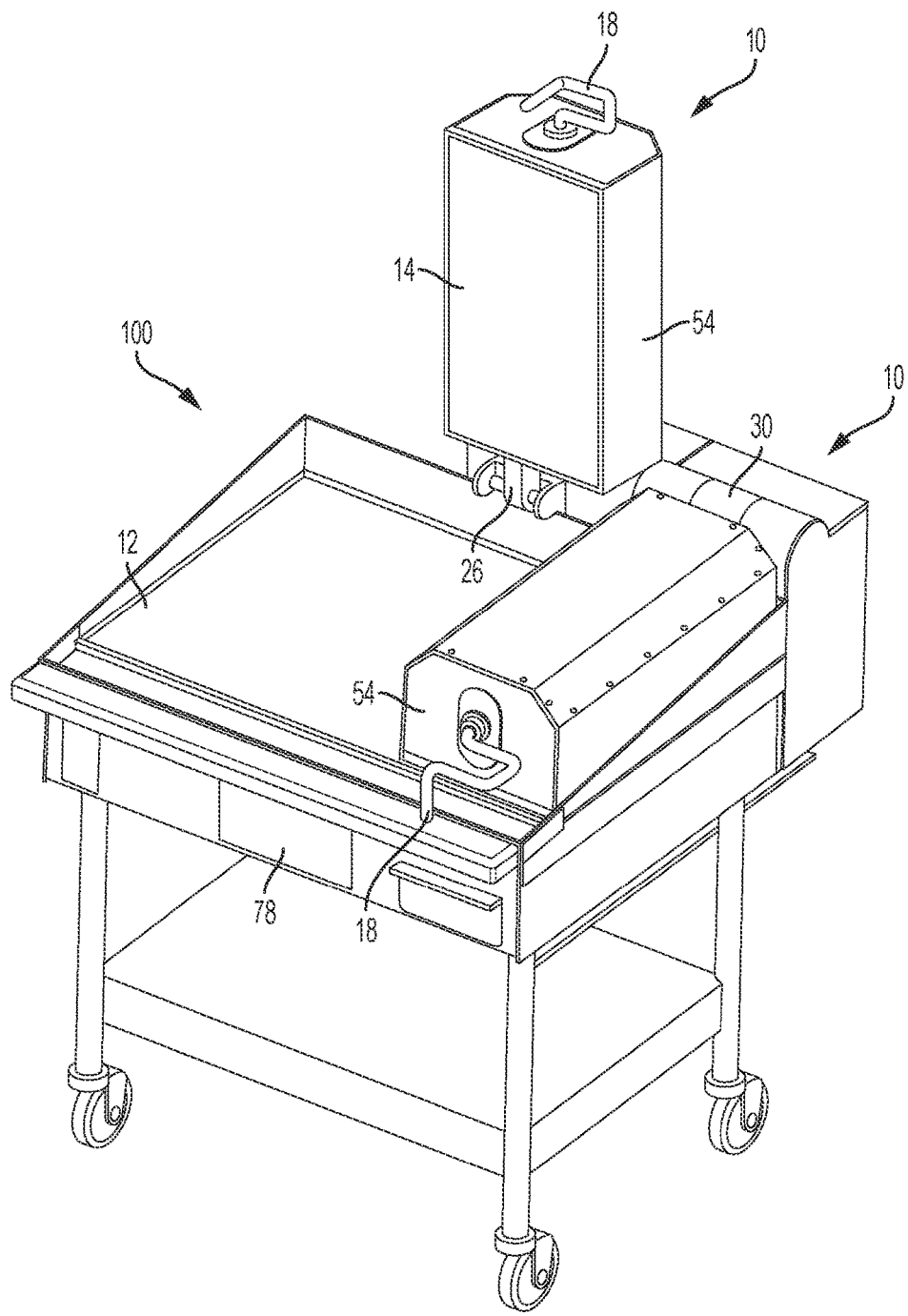
FIG. 11 is a perspective view of a cooking device made in accordance with the present disclosure, illustrating adjustable upper platen assemblies in a closed and open position respectively.

The present disclosure provides vertically adjustable upper platen assemblies useable in clamshell grill configurations such as cooking device 100 (FIG. 11). In particular, upper platen assemblies 10 (FIGS. 1-3), 110 (FIGS. 4-6) and 210 (FIGS. 7-9) are configurable between an open configuration and a closed configuration. In the open configuration, the upper cooking surface of cooking cover 14 is pivoted away from, and non-parallel to, the cooking surface of lower platen 12 (as shown in the left assembly of FIG. 11). In the closed configuration, cooking cover 14 is adjacent to, and substantially parallel with, lower platen 12 (as shown in the right assembly of FIG. 11). Lower platen 12 is fixed to a frame and may be elevated by legs of cooking device 100, as illustrated in FIG. 11. In general, lower platen 12, the frame to which it is attached, and other components of cooking device 100 excluding upper platen assembly 10 is considered "fixed" while upper platen assembly 10 is moveable relative to the fixed component.

Figure 10:
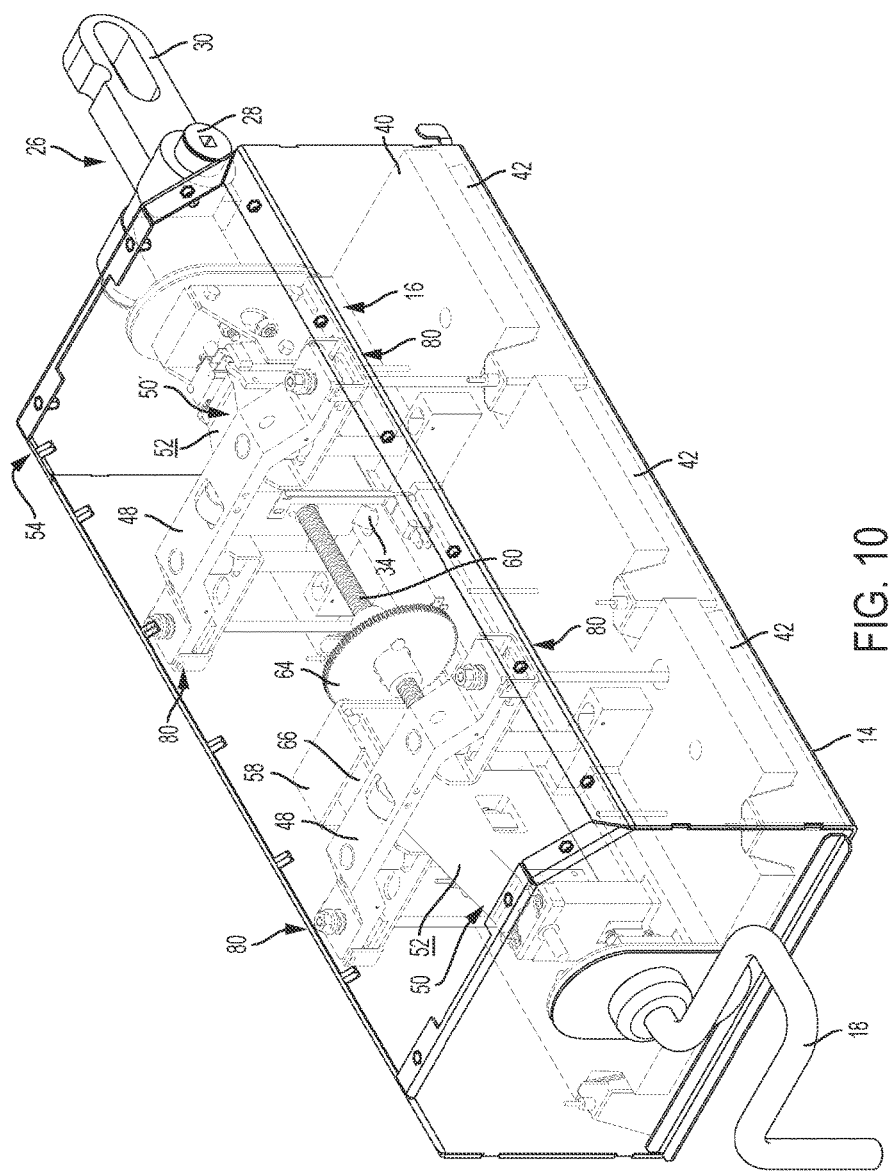
FIG. 10 is a perspective view of the upper platen assembly shown in FIG. 1, including an upper platen cover.

As described in detail below, each of upper platen assemblies 10, 110 and 210 offer vertical adjustment of cooking cover 14 in the closed position, such that cooking cover 14 can be spaced from lower platen 12 by a variable distance by operation of controller 78. This spacing-distance adjustment can be controlled with high accuracy and precision, and rapidly adjusted, such that cooking device 100 can be easily reconfigured to suit foods of differing sizes, thickness and cooking needs. The vertical adjustment mechanisms of assemblies 10, 110, 210 may be covered by an external housing 54, as shown in FIGS. 10 and 11, which may be made of a resilient material such as stainless steel.

In the illustrative embodiment of FIG. 11, cooking device 100 is a steam griddle of the type used for, e.g., high-throughput food preparation operations, such as "fast food" stores. Advantageously, the vertical adjustment provided by the systems disclosed herein may be accurately controlled over a long service life with a minimum of intervention, either in the form of programming, verification or maintenance, by the operator of cooking device 100.

2. Vertical Adjustment Mechanism

Figure 2:
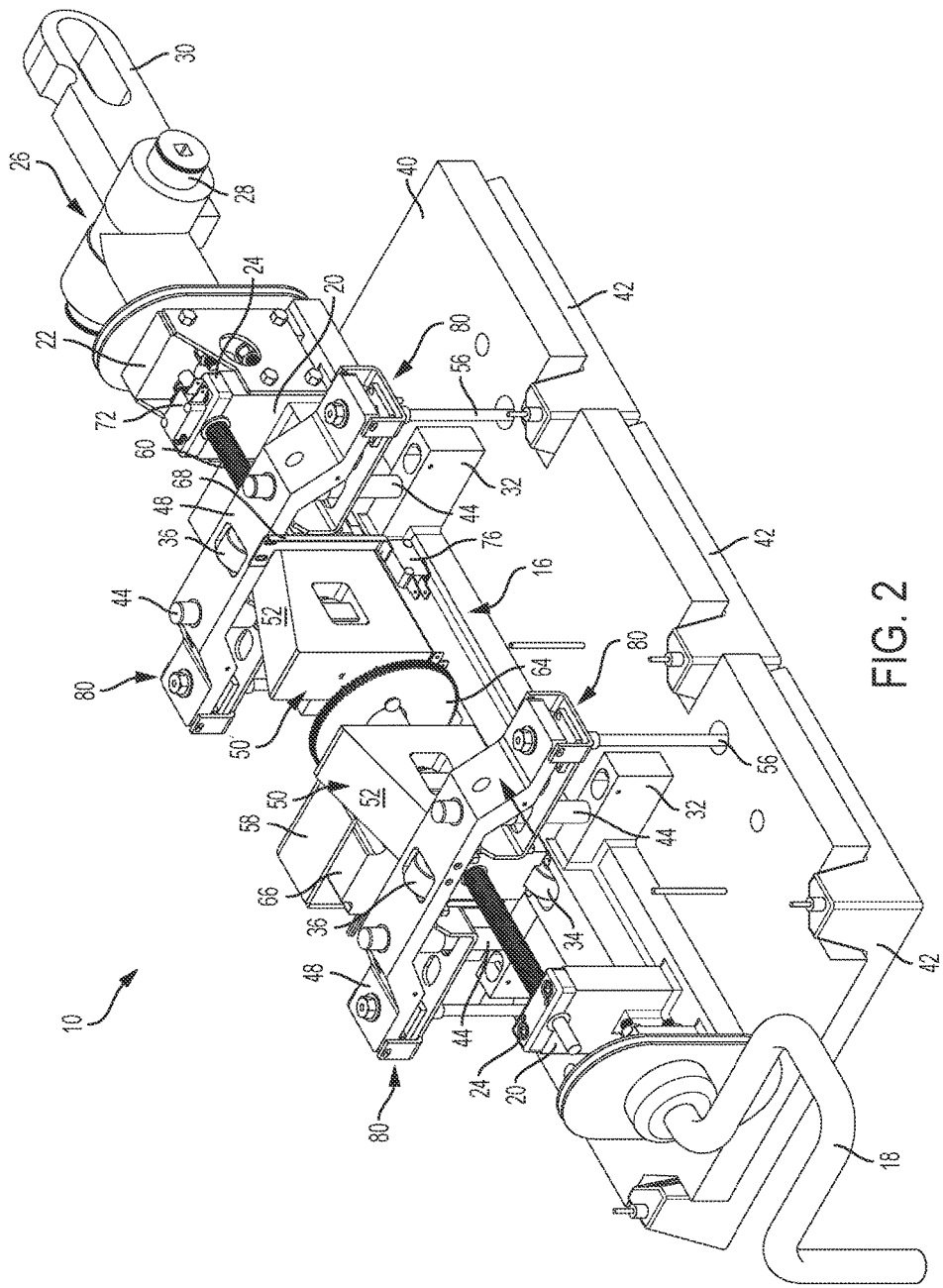
FIG. 2 is another perspective view of the upper platen assembly shown in FIG. 1, illustrating the heaters in a fully lowered configuration.
Figure 3:
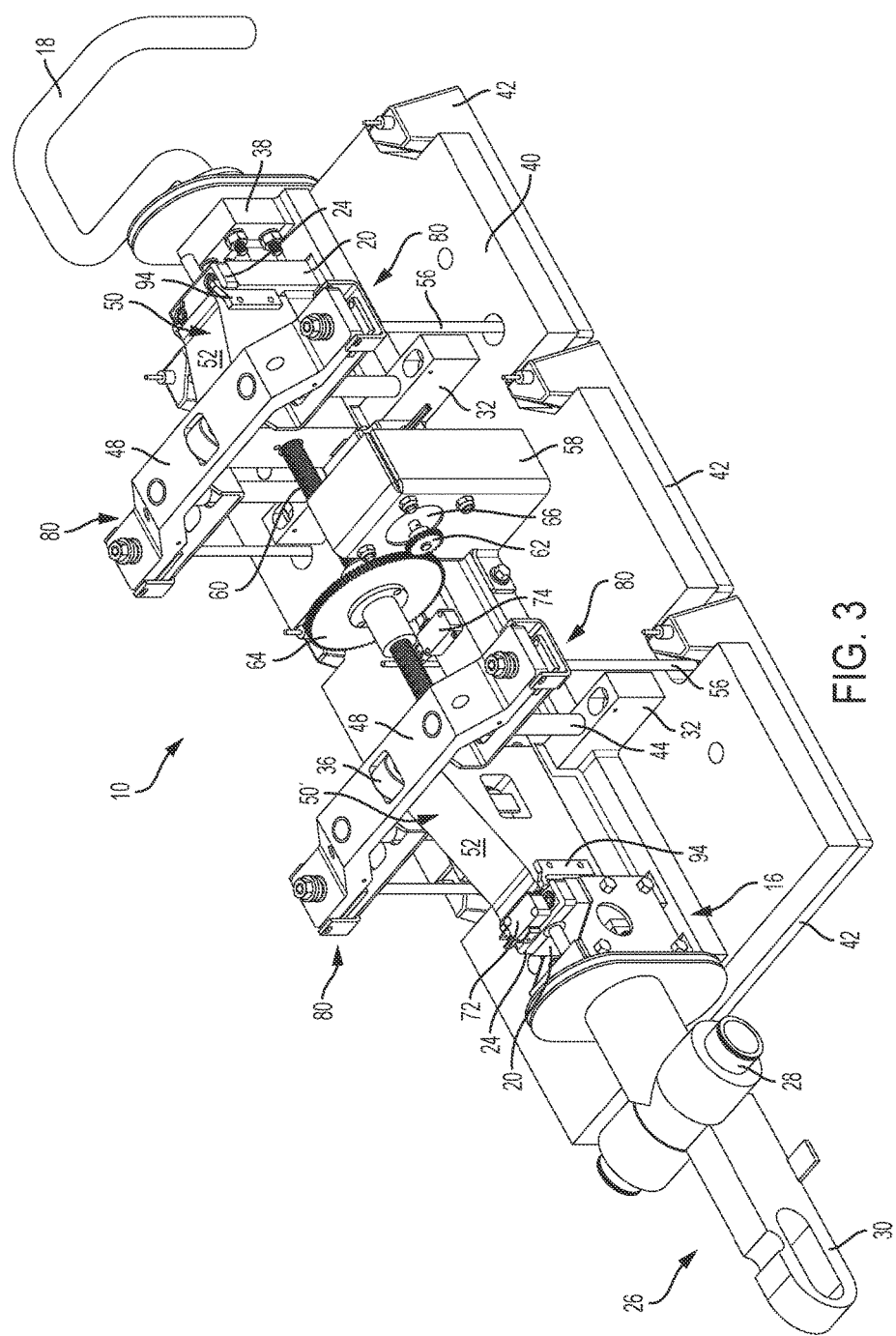
FIG. 3 is another perspective view of the upper platen assembly shown in FIG. 1, taken from a rear, pivot side of the assembly.

Turning now to FIGS. 1-3, upper platen assembly 10 is illustrated with vertically adjustable heaters 42 shown in a fully raised configuration (FIGS. 1 and 3) and a fully lowered configuration (FIG. 2). As described in detail below, the vertical position of heaters 42 may be precisely, repeatably and quickly adjusted by actuation of motor 66 to any position between the fully raised and fully lowered configurations. When used in conjunction with cooking device 100 including lower platen 12 (FIG. 11), this vertical adjustability of heaters 42 and the associated cooking cover 14 (FIGS. 10 and 11) facilitates a rapid and repeatable adjustment of the vertical gap between lower platen 12 and cooking cover 14 in order to accommodate differing food thicknesses and cooking requirements. In the illustrated embodiment, cooking cover 14 is a sheet disposed between heaters 42 and the cooking space, and thereby provides an upper cooking surface. Cooking cover 14 may be, for example, a Teflon coated or cast iron sheet which cooperates with housing 54 (FIG. 10) to substantially isolate the vertical adjustment mechanisms of upper platen assembly 10.

In an exemplary embodiment, heaters 42 are heavy duty aluminum in-cast heaters are mounted to the inside of housing 54. Heaters 42 may be independently controlled (e.g., by controller 78) to a common temperature set-point and thereby provide a durable, even heating system.

As best seen in FIG. 1, upper platen assembly 10 includes mainstay 16, which forms a stationary longitudinal "backbone" supporting the moveable components and mechanisms used for vertical adjustment of heaters 42, as described further below. At a proximal end portion of mainstay 16 (i.e., the portion of mainstay closer to a user of cooking device 100), handle support stanchion 38 provides a rigid mounting point for lifting handle 18. At an opposing distal end portion of mainstay 16, arm support stanchion 22 similarly provides a rigid mounting point for hinge arm 26. In the illustrated embodiment, mainstay 16 is a rigid component made of, e.g., cast aluminum or steel. Mainstay 16 may be monolithically formed as a single component, or may include a monolithically formed proximal-to-distal longitudinal "spine" with welded appendages, e.g., stanchions and flanges as described herein.

Hinge arm 26 includes hinge 28, which may be rotatably mounted to cooking device 100 as shown in FIG. 11. Counterweight extension 30 extends distally from hinge 28, and may provide an aperture (as shown), hook or other provision for attachment of a counterweight, such as an extension spring "pulling" downwardly from below extension 30 or a compression spring "pushing" downwardly from above extension 30, in order to aid in the pivotable opening of upper platen assembly 10 by an upward force upon lifting handle 18. In one exemplary embodiment, described in detail below, counterweight extension 30 may be coupled to an counterweight mechanism 300 which enables upper platen assembly 10 to be pivoted upwardly by operation of controller 78 alone, and without user input at handle 18.

Mainstay 16 also includes shaft support stanchions 20 at the proximal and distal portions of mainstay 16, respectively. Lead screw 60 is rotatably supported at its axial ends by stanchions 20, such as via roller bearings as illustrated, and these axial ends are captured on stanchions 20 by stanchion retainer caps 24 fixed to stanchions 20. Thus, lead screw 60 can rotate freely about its longitudinal axis, which in the illustrated embodiment is substantially parallel to the longitudinal proximal-to-distal axis defined by the spine of mainstay 16.

Output gear 64 is fixed to lead screw 60, and is approximately axially equidistant from each of stanchions 20 and the associated axial ends of lead screw 60. As further described below, rotation of output gear 64 and lead screw 60 is powered by input gear 62 (FIG. 3), which is fixed to motor 66 providing the source of power for rotation of the lead screw 60. Motor 66 is fixed to mainstay 16, such as via an upstanding motor bracket 58 as illustrated. In an exemplary embodiment, motor 66 is an electric stepper motor with an internal encoder, as described in further detail below.

Lead screw 60 is oppositely threaded at either side of output gear 64, i.e. a left-hand thread extends proximally away from output gear 64 and a right-hand thread extends distally therefrom, or vice-versa. In an exemplary embodiment, each of these left- and right-hand thread forms are trapezoidal type thread forms, commonly referred to as "Acme" threads of the type commonly used for converting lead screw rotation to linear motion of a bushing threadably engaged with the lead screw.

Gapping wedges 50 and 50' are threadably engaged with lead screw 60 on either side of output gear 64, as illustrated in FIGS. 1 and 2. Wedges 50 and 50' may be substantially identical to one another, but include oppositely threaded bushings or threaded bores therethrough for engagement with the oppositely threaded proximal and distal portions of lead screw 60, respectively. Each of wedges 50, 50' includes ramped surface 52 facing upwardly away from lead screw 60 and outwardly away from output gear 64. Wedges 50, 50' are arranged as mirror images of one another such that ramped surfaces 52 are oppositely oriented with respect to one another. Lifting cross members 48 are moveably positioned upon each of the ramped surfaces 52 via upper wedge rollers 36, and can travel upwardly and downwardly along the ramped surfaces 52 as wedges 50, 50' linearly translate along a proximal/distal direction as described in further detail below. In the illustrated embodiment, a lower wedge roller 34 is rotatably coupled to mainstay 16 and positioned to engage a channel formed on a lower surface of each of wedges 50, 50', such that wedges 50, 50' are supported on roller 34 and can translate along their linear path with low friction.

Referring still to FIG. 1, insulation 40 and heaters 42 are positioned below mainstay 16, and are moveable vertically with respect thereto. In particular, three heaters 42 are arranged along a lower surface of insulation 40, and affixed to insulation 40 such that insulation 40 and heaters 42 all move together as a single unit during vertical adjustment. This combination of insulation 40 and heaters 42 is suspended from cross members 48 via tie rods 56. Specifically, tie rods 56 are fixed at their lower ends to one of heaters 42 (e.g., by engagement of a threaded rod-end with threaded bores in heaters 42), and coupled at their upper ends to respective opposing ends of cross members 48 by a thread/nut arrangement as illustrated. The thread/nut arrangement at each of tie rods 56 may be adjusted to provide individual corner adjustment capability to allow, e.g., for the cooking surface of upper platen assembly 10 to be made substantially parallel with lower platen 12 upon installation to cooking device 100 (FIG. 11).

Figure 12:
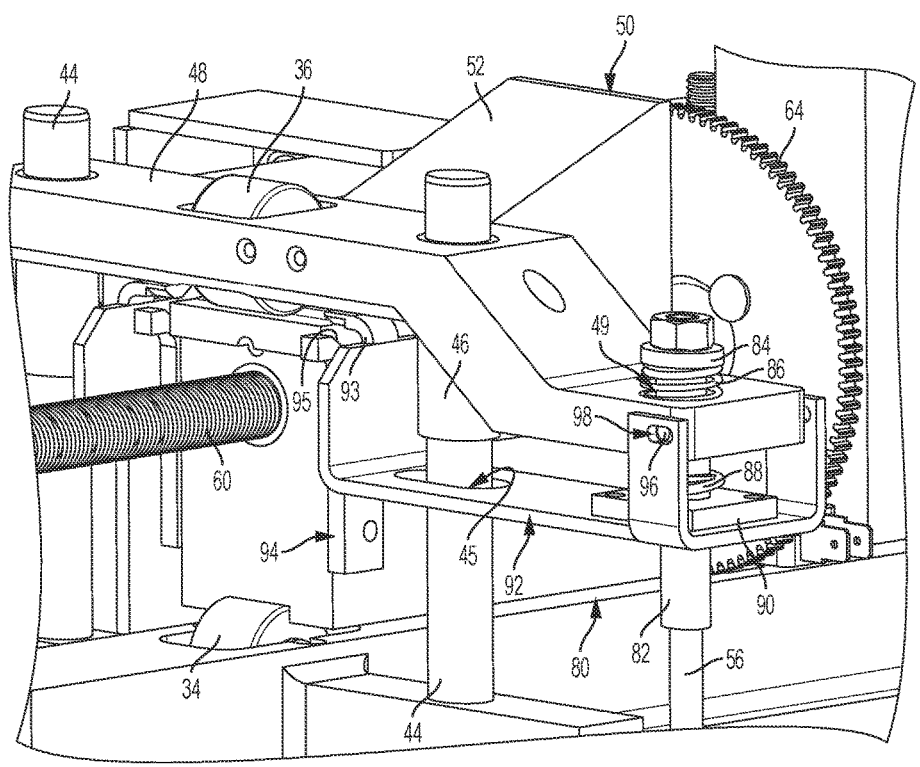
FIG. 12 is an enlarged perspective view of a portion of the upper platen assembly shown in FIG. 1, illustrating a leveler assembly made in accordance with the present disclosure.

In an exemplary embodiment, some motion or "float" is allowed between the upper ends of tie rods 56 and their attachment points at cross members 48 by leveler assemblies 80, which operate to automatically orient cooking cover 14 parallel to lower platen 12 when upper platen assembly 10 is in its fully lowered configuration, as described in detail below. As best seen in FIG. 12, a nut is threadably attached to an upper end of tie rod 56, which prevents tie rod 56 from being pulled down through bore 49 through cross members 48. However, the nut allows tie rod 56 to translate upwardly through sleeve 82 (described further below), such that tie rods 56 are capable of sliding upwardly through sleeves of cross members 48. When cooking cover 14 reaches its lowermost configuration, any items contained in the cooking space therefore cannot be crushed using the force of motor 66. This also provides a safety feature by ensuring that cooking cover 14 will only compress items in the cooking space using the weight of heaters 42.

The vertically moveable components of assembly 10, including cross members 48, heaters 42 and insulation 40, are maintained in parallel with mainstay 16 (e.g., with a lower surface of mainstay 16, which is substantially planar) by guide rods 44 as shown in FIGS. 1 and 2. Guide rods 44 are fixed to mainstay 16 via guide rod flanges 32 which extend laterally outwardly from the main spine of mainstay 16 as shown in FIG. 1. As illustrated, each of cross members 48 is slideably coupled to a pair of substantially parallel and vertically oriented guide rods 44 at each lateral side of wedges 50, 50'. In the exemplary embodiment illustrated, lubricious bushings 46 (FIG. 12), such as oil-impregnated bronze sleeves, are disposed between guide rods 44 and the corresponding aperture formed in cross member 48, such that cross members 48 may move smoothly up and down along each respective pair of guide rods 44 while retaining their illustrated orientation and configuration (i.e., level and extending transversely across wedges 50, 50').

3. Vertical Adjustment Operation and Control

In operation, motor 66 receives an activation command from controller 78 (FIG. 11), which rotates input gear 62 (FIG. 3) in a desired direction. Output gear 64, which is drivingly intermeshed with input gear 62 is shown in FIG. 3, rotates lead screw 60, causing gapping wedges 50, 50' to linearly translate along the longitudinal axis of lead screw 60. For example, with wedges 50, 50' spread apart from one another by a maximum distance as shown in FIG. 1, lead screw 60 may rotate to draw wedges 50, 50' toward one another (and toward output gear 64). Such rotation amounts to a lowering operation of upper platen assembly 10, as translation of wedges 50, 50' toward one another causes cross members 48 to roll down their respective supporting ramped surfaces 52.

Once wedges 50, 50' have moved inwardly to the configuration of FIG. 2, cross members 48 have traversed the longitudinal extent of ramped surfaces 52, such that rollers 36 have reached the bottom of ramped surfaces 52 and upper platen assembly 10 is therefore in its fully lowered configuration. At this point, the rotation direction of lead screw 60 may be reversed, which begins the translation of wedges 50, 50' in the opposite direction up ramps 52, thereby once again raising insulation 40 and heaters 42 toward the raised configuration.

At any point during this upward or downward vertical translation, motor 66 may be deactivated to halt any further rotation of lead screw 60. Upon such deactivation, cross members 48 will stop at their respective current positions along ramped surfaces 52. This, in turn, fixes the corresponding vertical position of insulation 40 and heaters 42. Thus, the vertical position of heaters 42 may be precisely controlled by directing wedges 50, 50' to linearly translate along lead screw 60 to a particular linear position which places cross members 48 at a desired position along ramped surfaces 52 corresponding to the desired vertical position of heaters 42.

Controller 78 may provide automated positioning of upper platen assembly 10 in a desired configuration. In particular, assembly 10 may include an encoder (not shown) coupled to lead screw 60 and communicatively attached to controller 78. As lead screw 60 rotates, the encoder may output pulses corresponding to a set amount of rotation of lead screw 60 to controller 78, such that controller 78 may continuously monitor the number of rotations of lead screw 60 over a given time interval. Using an appropriate multiplier taking account of the thread pitch of lead screw 60 and the slope of ramped surfaces 52, controller 78 then calculates a desired number of encoder rotations corresponding to a desired vertical translation of heaters 42 and insulation 40. When the desired number of encoder pulses is achieved, controller 78 disengages motor 66 to halt further translation of wedges 50, 50' and fix the vertical position of insulation 40 and heaters 42. Alternatively, motor 66 may include an internal encoder (not shown) which measures rotation of the motor mandrel and can be used in the same manner described above, except controller 78 is also programmed to account for the gear reduction provided by input and output gears 62 and 64 in its calculation of the vertical position of insulation 40 and heaters 42.

A series of limit sensors 72, 74, 76 are also provided in the illustrated embodiment in the form of proximity switches which provide signals to controller 78 indicative of the limits of travel for wedges 50, 50'. In particular, upper limit sensor 72 is positioned upon the distal stanchion 20 and configured and positioned to be actuated by an outer surface of wedge 50' when wedge 50' is at a desired maximum distance away from wedge 50 (and output gear 64). Thus, in the illustrated configuration, upper limit sensor 72 provides a signal to controller 78 indicating that wedge 50' (and, therefore, also wedge 50) has reached the outer limits of its useful travel and cross member 48 has reached its upper limit along ramped surface 52. Controller 78 then prevents any further motor actuation drawing wedges 50, 50' away from one another.

Conversely, FIG. 3 illustrates lower limit sensor 74 positioned to be actuated by an inner surface of wedge 50' when wedge 50' is at its inner limit of travel, i.e., wedge 50' is at a minimum desired distance from wedge 50 (and output gear 64). Thus, in the illustrated configuration, lower limit sensor 74 provides a signal to controller 78 indicating that wedge 50' (and, therefore, also wedge 50) has reached the inner limits of its useful travel and cross member 48 has reached its lower limit along ramped surface 52. Controller 78 then prevents any further motor actuation drawing wedges 50, 50' toward one another.

Optionally, a third switch may be provided in the form of lower stop sensor 76, shown in FIG. 1. As illustrated, lower stop sensor 76 is fixed to cross member 48 via sensor bracket 68, and is positioned to impact the adjacent upwardly facing surface of mainstay 16 when cross member 48 reaches its bottom position, as shown in FIG. 2. Sensor 76 then sends a signal to controller 78 indicating that no further motor actuation in a lowering direction should occur. Thus, sensor 76 provides a signal directly related to the vertical position of cross member 48 relative to mainstay 16, and therefore may prevent spatial conflicts caused by motor 66 even if lower limit sensor 74 is not functioning properly.

In one exemplary embodiment, controller 78 may be programmed to the reset its internal encoder count to zero (or any predetermined nominal value) upon actuation of one or more of limit sensors 72, 74, 76. Because limit sensors 72, 74, 76 are physically located at a desired end position of the vertical adjustment mechanism of assembly 10, this reset-to-zero functionality provides an automatic calibration of the system each time a limit is reached. In one exemplary embodiment, controller 78 may include a startup routine whereby lead screw 60 is rotated in one or both directions until upper and/or lower limit sensors 72, 74 and/or lower stop sensor 76 is actuated by wedge 50', such that the encoder count is calibrated to the physical location of wedges 50, 50' each time controller 78 is powered on.

As noted above, several stages of reduction are built into various structures of assembly 10, all cooperating to provide repeatable, precise and rapid vertical adjustment of cooking cover 14 and heaters 42, while at the same time maintaining low cost and a simple control system and logic. Specifically, gears 62, 64 provide a first reduction, lead screw 60 provides a second reduction, and the geometry of ramped surfaces 52 provides a third reduction. The size and configuration of gears 62, 64 can be chosen to increase the number of rotations of the mandrel of motor 66 for each full rotation of lead screw 60. The thread form of lead screw 60 can be chosen to provide a desired amount of linear motion of wedges 50 for a given rotation of output gear 64. Further, the length and slope of ramped surfaces 52 can be chosen to a provide a desired amount of vertical movement of cross member 48 for a given linear motion of the adjacent wedge 50. In an exemplary embodiment, ramped surfaces 52 are linear, i.e., a given amount of translation along the longitudinal axis of lead screw 60 equates to a set amount of vertical movement of cross members 48 along any given portion of ramped surface 52.

In one exemplary embodiment, the gear reduction provided by gears 62, 64 may be between 1:1 and 10:1, such as by output gear 64 being smaller than input gear 62. The thread pitch of lead screw 60 may be between 10 threads per inch and 20 threads per inch, and the slope of ramped surfaces 52 may be between 10% (i.e., 0.5-inches vertical rise per 4.75-inches horizontal run) and 70% (i.e., 2.0-inches vertical rise per 2.80-inches horizontal run). These variables may be combined to provide a relatively small vertical adjustment of cooking cover 14 for every full rotation of the mandrel of motor 66. In the exemplary embodiment described above, this vertical adjustment per rotation may be as little as 0.0005-inches, 0.00053-inches, 0.00105-inches or 0.00175-inches, or as much as 0.0035-inches, 0.00357-inches, 0.007-inches or 0.00714-inches, or may be any value within any range defined by any pair of the foregoing values.

In alternative embodiments, any combination of mechanical reductions may be used to achieve the desired fine, repeatable adjustment described herein. For example, lead screw 60 may be combined with ramped surfaces 52, but without the mechanical reduction provided by gears 62, 64. In another example, lead screw 60 may provide a 1:1 thread pitch (e.g., one rotation of lead screw 60 advances wedges 50, 50' by a distance equal to the circumference of lead screw 60), and mechanical reduction may be provided by gears 62, 64 and ramped surfaces 52. Moreover, any permutation of mechanical reductions may be used in accordance with the present disclosure in order to provide fine vertical adjustment, as required or desired for a particular application.

4. Automatic Tie Rod Adjustment

As noted above, leveler assembly 80 is provided at each junction between tie rods 56 and cross members 48. The illustrated embodiment of FIG. 12 illustrates a single one of the four assemblies 80 used in the illustrated embodiment of upper platen assembly 10, it being understood that the remaining three adjusting mechanisms have the same structure and operation. Leveler assemblies 80 collectively provide for automatic leveling of cooking cover 14 with respect to lower platen 12, such that the upper and lower cooking surfaces are configured in parallel to one another each time upper platen assembly 10 is brought to its fully lowered configuration (FIG. 2).

FIG. 12 is an enlarged view of a lateral end of one of cross members 48, illustrating the components of leveler assembly 80 and their relationship with tie rod 56 and cross member 48. Adjuster sleeve 82 passes through the aperture formed through clutch insert 90, as illustrated, with substantial clearance such that the longitudinal axis of the aperture through clutch insert 90 can skew with respect to the longitudinal axis of the aperture through sleeve 82. In an exemplary embodiment, the radial clearance between sleeve 82 and the aperture through insert 90 is about 0.010-inches such that clutch insert 90 is capable of skewing up to 10 degrees in any direction with respect to sleeve 82. As further described below, this skewing operates to selectively frictionally lock sleeve 82 to clutch insert 90 and latch lever 92.

The latch lever 92 of leveler assembly 80 is pivotably attached to cross member 48 via pivot pin 96 and a laterally elongated pivot slot 98. As illustrated in FIG. 12, latch lever 92 also includes a laterally elongated slot 45 through which guide rod 44 passes, with slot 45 sized to allow pivoting of lever 92 through its full range of motion without contacting guide rod 44.

The pivotable range of motion of lever 92 is dictated by the interaction between clutch insert 90, sleeve 82 and bore 49 of cross member 48. In particular, a close tolerance (e.g., less than 0.005-inches) is provided between the bore 49 of cross member 48 and the outer diameter of adjuster sleeve 82 passing therethrough. Therefore, latch lever 92 rotates about pivot pins 96 while adjuster sleeve 82 remains substantially coaxial with bore 49 through cross member 48. Thus, the longitudinal axis of the bore through latch lever 92 can skew with respect to the longitudinal axis of adjuster sleeve 82, and the angular limits of this skewing therefore sets the range of pivotable motion for latch lever 92. In addition, pivot pin 96 constrains the pivoting motion of latch lever 92 to lateral pivoting motion while preventing proximal-to-distal pivoting motion. Although clutch insert 90 is illustrated as a separate component fixed to latch lever 92 (e.g., by welding), clutch insert 90 and latch lever may be formed a single component by, e.g., thickening the material of lever 92 in the area of insert 90.

Figure 13:
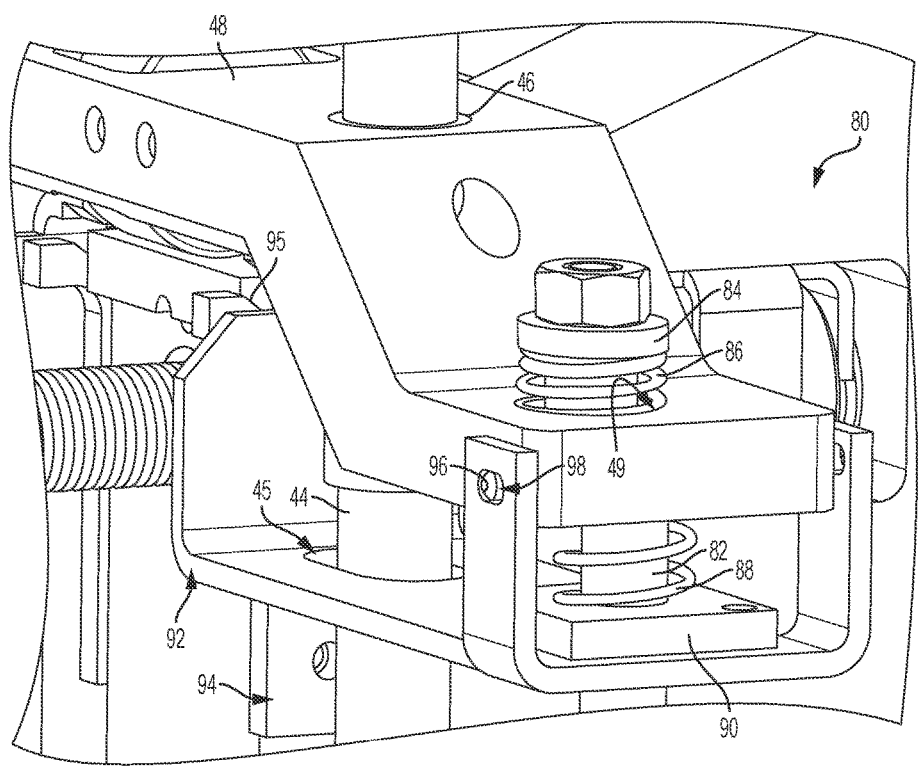
FIG. 13 is another perspective view of the leveling assembly of FIG. 12.

As best seen in FIG. 13, leveler assembly 80 further includes upper clutching spring 86 and lower clutching spring 88 which establish "default" positions of sleeve 82 and latch lever 92 respectively. Upper spring 86 is compressed between an upper surface of cross member 48 and flange 84, such that spring 86 is positioned and configured to urge upper flange 84 of sleeve 82 upwardly away from cross member 48. Lower clutching spring 88 is compressed between the lower surface of cross member 48 and the adjacent upper surface of clutch insert 90. Because lower clutching spring 88 is positioned laterally inwardly of pivot slot 98 of latch lever 92 (i.e., closer to wedges 50, 50') spring 88 urges latch lever 92 to pivot downwardly away from cross member 48 to one of its limits of travel, in which the outer surface of sleeve 82 contacts the upper and lower annular corners defined by bore 49.

When in the downwardly-pivoted limit position, this contact urges leveler assembly 80 into a frictionally locked configuration. Specifically, the normally biased position of latch lever 92 causes a pinching action between the aperture through clutch insert 90 and adjuster sleeve 82. This pinching action fixes adjuster sleeve 82 to cross member 48 via latch lever 92, such that upward or downward movement of cross member 48 causes a corresponding movement of adjuster sleeve 82 and latch lever 92. With adjuster sleeve 82 fixed to latch lever 92 in this way, as wedges 50, 50' are translated by actuation of lead screw 60 (as described above), both cross member 48 and adjuster sleeve 82 move vertically as a single unit, carrying tie rods 56 and heaters 42. In an exemplary embodiment, clutch insert 90 and adjuster sleeve 82 are hardened to enhance the friction of the "pinching" action therebetween and extend the service life of the parts.

Sleeve 82 has a central bore which slidingly receives tie rod 56. At the upper end of adjuster sleeve 82, a nut is threadably secured to tie rod 56 and abuts flange 84. With the nut secured to the upper end of tie rod 56 and abutting adjuster sleeve 82 as shown in FIG. 13, upward movement of cross member 48 and the adjuster sleeve 82 causes upward movement of rod 56, and therefore also of heaters 42 and insulation 40 (as described in detail above).

Figure 14:
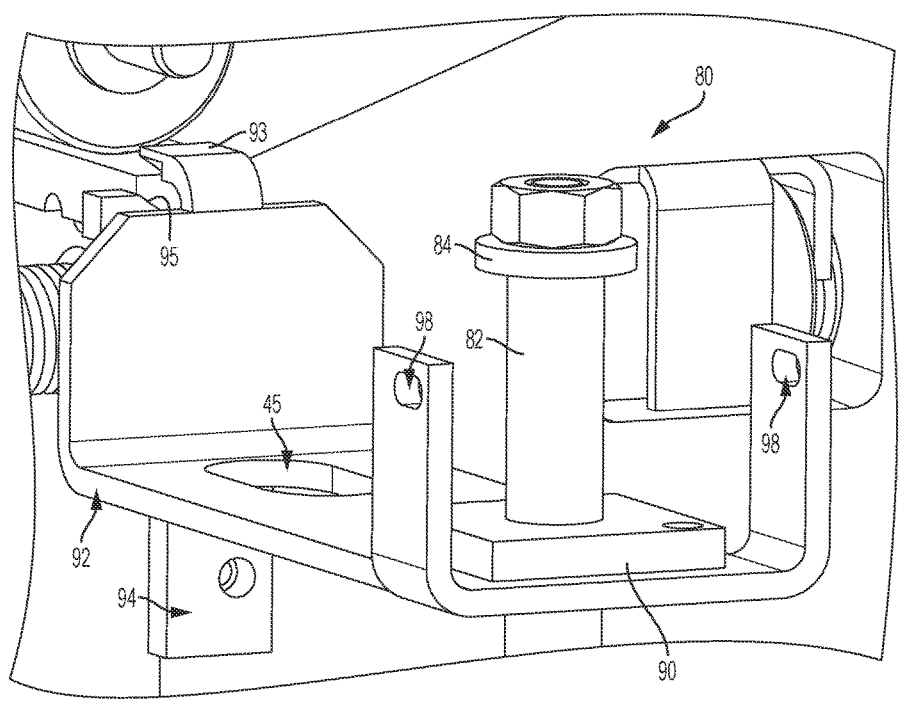
FIG. 14 is another perspective view of the leveling assembly of FIG. 12, shown with some components removed for clarity.
Figure 15:
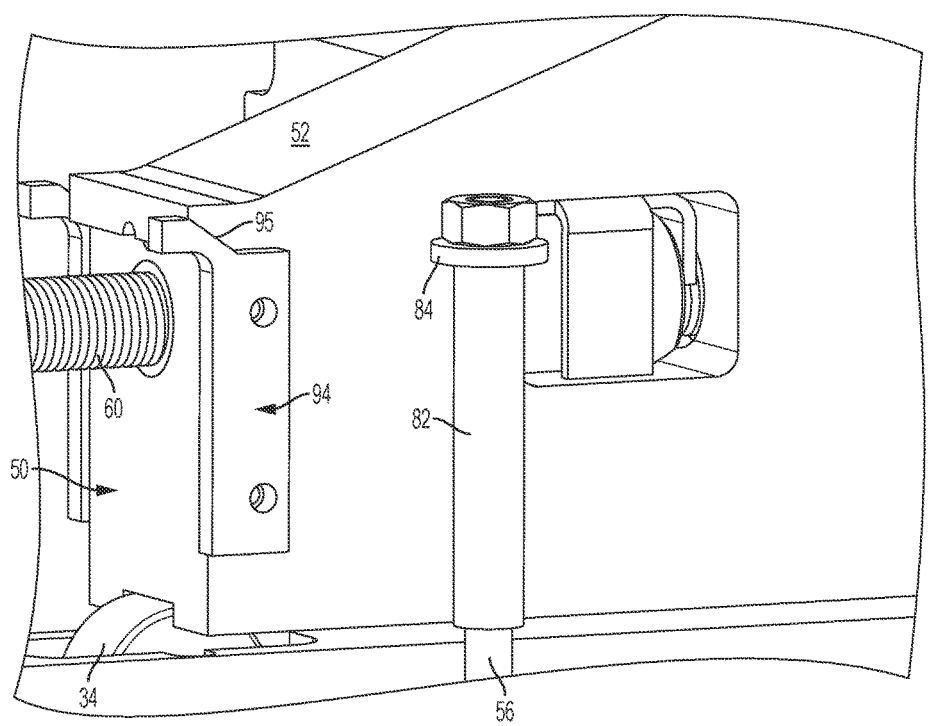
FIG. 15 is another perspective view of the leveling assembly of FIG. 14, shown with additional components removed for clarity.
Figure 16:
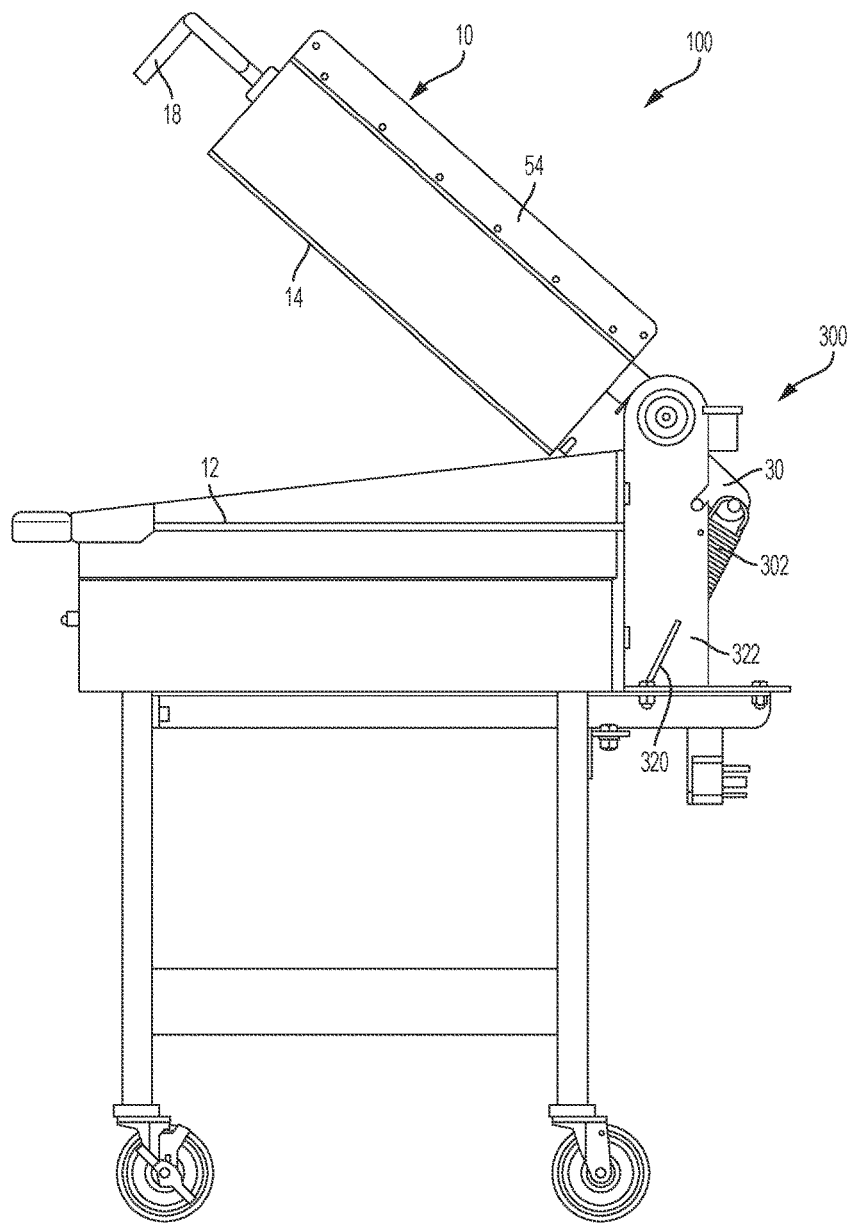
FIG. 16 is a side elevation view of a cooking device including an upper platen assembly and counterweight system made in accordance with the present disclosure.

FIG. 14 illustrates latch lever 92 and excludes cross member 48 for clarity. As shown, latch lever 92 includes an actuator protrusion 93 at its inward end. Latch ramp 94 is fixed to the lateral surface of wedge 50 adjacent the proximal end thereof, as best seen in FIG. 15 which excludes both cross member 48 and latch lever 92 for clarity.

When wedges 50, 50', are translated inwards by lead screw 60 to the fully lowered configuration, as shown in FIG. 2 and described in detail above, protrusion 93 contacts ramp surface 95 of latch ramp 94 as cross member 48 approaches its lowered configuration. Protrusion 93 rides upwardly along the ramp surface 95 as wedge continues its final inward translation, causing latch lever 92 and clutch insert 90 to pivot vertically upwards about pins 96 against the biasing force of spring 88. This upward pivot frees sleeve 82 from its pinched configuration with clutch insert 90, which allows adjuster sleeve 82 to "float", i.e., translate freely within bore 49 of cross member 48. When the pinching action is relieved and adjuster sleeve 82 is allowed to axially translate, upper spring 86 biases adjuster sleeve 82 against the nut secured to tie rod 56 and urges sleeve 82 upwardly within bore 49.

As illustrated and described above, leveler assembly 80 provides for automatic leveling of cooking cover 14 with respect to lower platen 12 each time upper platen assembly 10 is configured into its fully lowered position. Turning again to FIG. 12, a portion of upper platen assembly 10 is shown in its closed configuration (in which cooking cover 14 is rotated into position above the cooperating lower platen 12, as illustrated in the right-hand portion of FIG. 11), and with cross member 48 in its fully lowered position. In this position, the downwardly-facing cooking surface of cooking cover 14 comes to rest upon the upwardly-facing cooking surface of lower platen 12. At the same time, protrusion 93 of latch lever 92 is engaged with ramp surface 95 of latch ramp 94, as shown in FIG. 14 and described above, such that each of leveler assemblies 80 are unlocked with sleeve 82 free to move within bore 49.

The weight of heaters 42 and housing 54 is enough to overcome the spring pressure exerted by springs 86. In particular, heaters 42 can cause the nut threaded to the upper end of tie rod 56 to pushes downwardly against flange 84, pushes against and compresses spring 86. Thus, when upper platen assembly 10 comes fully to rest upon lower platen 12 and all four leveler assemblies 80 are unlocked, each of the sleeves 82 automatically axially adjusts to allow cooking cover 14 to lie flat against lower platen 12. As a result of this automatic adjustment, the upper and lower cooking surfaces are automatically adjusted to be parallel to one another.

As wedges 50, 50' are translated outwardly away from one another to lift upper platen assembly 10 upwardly, spring 88 is allowed to pivot latch lever 92 downwardly such that protrusion 93 of the latch lever 92 slides downwardly along ramp surface 95 of the latch ramp 94. This downward pivot or rocking motion of the latch lever 92 and clutch insert 90 skews the bore of insert 90 with respect to sleeve 82 such that sleeve 82 engages with clutch insert 90 to create the "pinching" action which frictionally locks sleeve 82, latch lever 92 and cross member 48 as described above. At this point, the parallel configuration of lower platen 12 and cooking cover 14 is locked into place, and cooking device 100 is considered calibrated.

Cooking cover 14 may then be moved upwardly to establish the desired gap between cooking cover 14 and lower platen 12 as described in detail above. Because of the automatic calibration facilitated by leveler assemblies 80, the size of the gap between the cooking surfaces of cooking cover 14 and lower platen 12 is constant. This parallel relationship and associated constant gap size is facilitates efficient production of food products produced in such a system, by ensuring even heating of the various food products contained in the gap.

5. Counterweight Opening Mechanism

FIGS. 16-20 illustrate an exemplary counterweight system 300 for raising upper platen assembly 10 from its closed position over lower platen 12, in which the cooking surfaces are substantially parallel as described above, to its open position when cooking cover 14 is pivoted away from lower platen 12.

In particular counterweight hinge extension 30 is acted upon by two linear actuators in the form of extension springs 302 which act to "pull" upper platen assembly 10 towards its open configuration. In addition, an electric linear actuator such as electromagnet 304 acts on counterweight extension 30 to selectively counteract some of the pulling force of springs 302, effectively providing a "push" force which urges upper platen assembly 10 into its closed configuration. In an exemplary embodiment, the force of springs 302 is sufficient to automatically lift upper platen assembly 10 to the open configuration in the absence of any external influence (e.g., a pulling force on handle 18 or the pushing force provided by electromagnet 304).

When electromagnet 304 is de-energized, upper platen assembly 10 is therefore free to pivot upwardly under the force of springs 302. On the other hand, when electromagnet 304 is energized, its downwardly-urging force sufficiently overcomes the counteracting force of springs 302 to and pulls upper platen assembly 10 towards its closed configuration or, if already closed, to hold upper platen assembly 10 in its closed configuration. In this way, electromagnet 304 may provide a "latch" which retains upper platen assembly 10 in the down configuration during a cooking operation, as further described below.

Figure 17:
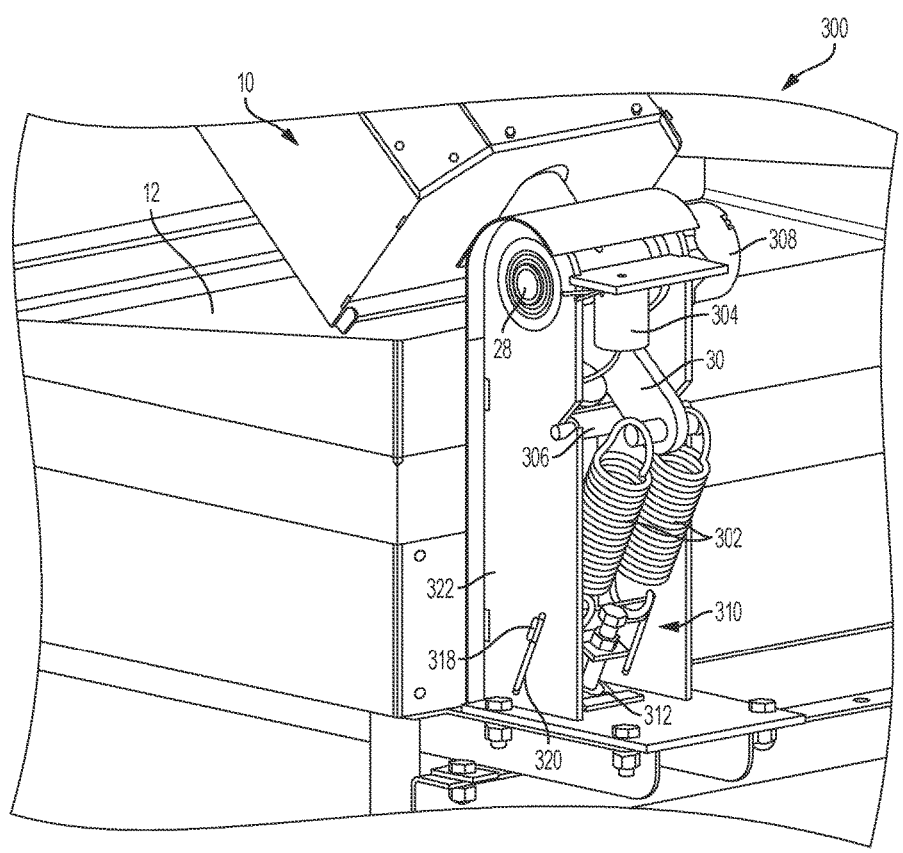
FIG. 17 is a perspective view of the counterweight system shown in FIG. 16.
Figure 18:
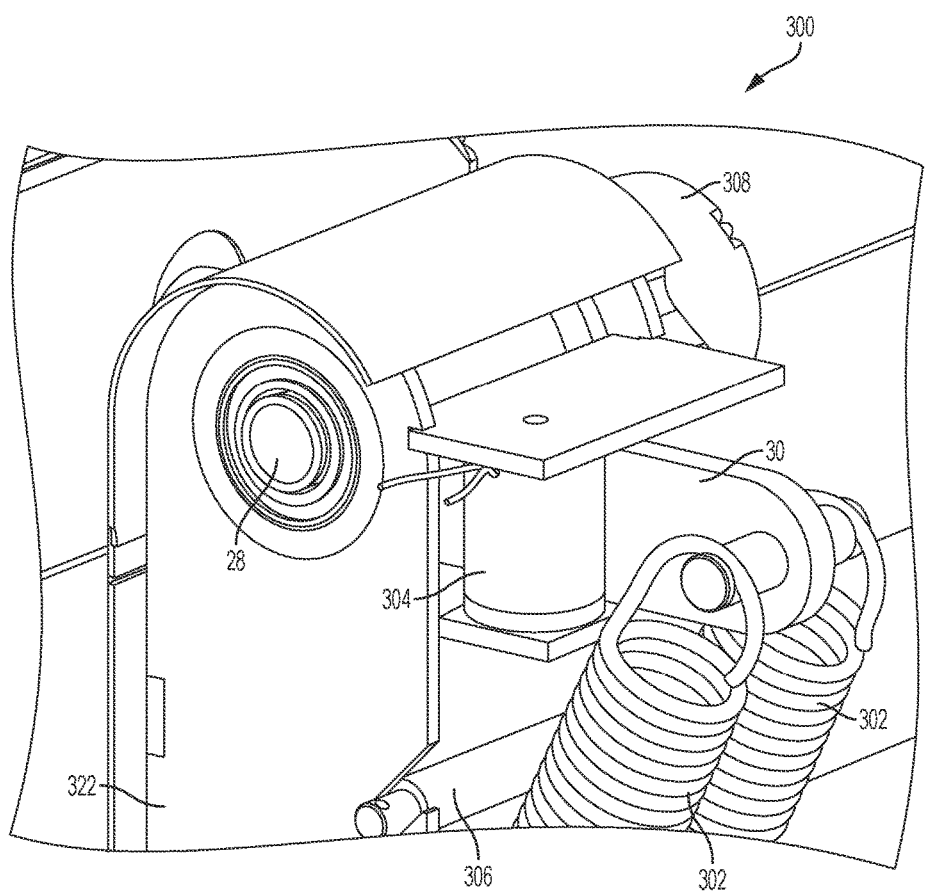
FIG. 18 is an enlarged perspective view of a portion of the counterweight system shown in FIG. 17.

As best seen in FIG. 17, limit pin 306 may be fixed to a portion of cooking device 100 and positioned to limit the maximum upwards pivoting of upper platen assembly 10 in the open configuration. Pin 306 may be positioned to prevent springs 302 from fully compressing, such that springs 302 remain at least slightly extended and therefore in a force-transferring configuration even when upper platen assembly 10 is fully open. Thus, springs will provide an opening force through the entire range of motion of upper platen assembly 10 during operation of cooking device 100. Pin 306 may be removed, which removes the limit on upwardly pivoting of upper platen assembly 10 and allows springs 302 to fully compress. This facilitates installation and removal of springs 302.

Figure 19:
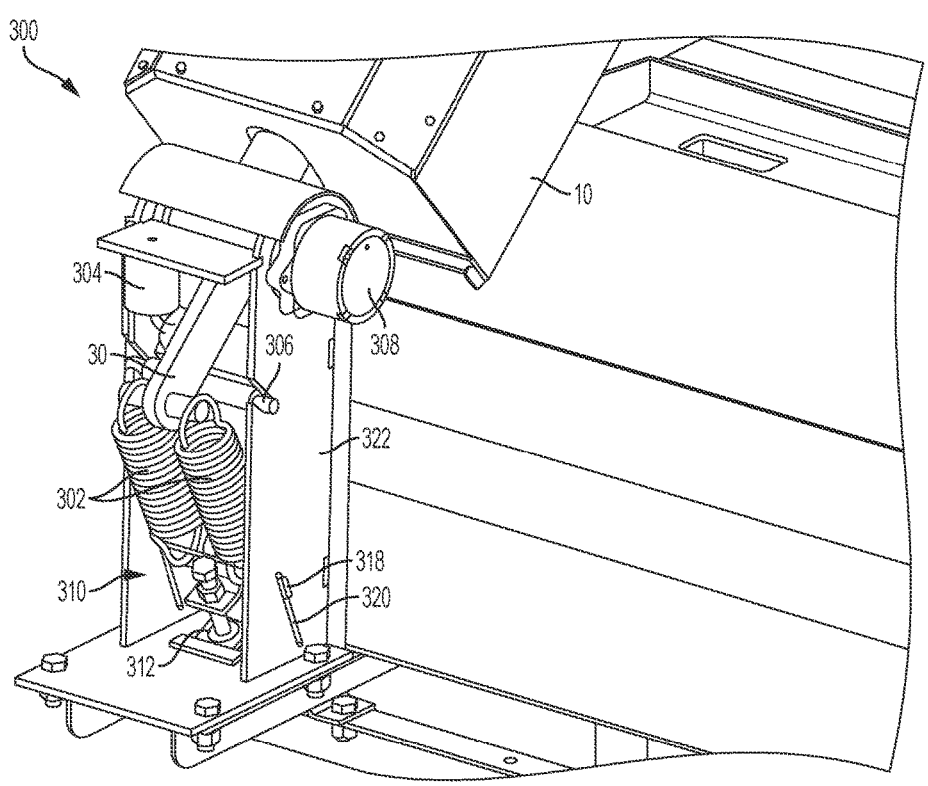
FIG. 19 is another perspective view of the counterweight system shown in FIG. 16.

Referring now to FIG. 19, damper 308 may be operably connected to hinge 28 of hinge arm 26, such as by rotatably fixing a first portion of a rotation damper to hinge 28 and rotatably fixing a second portion of the rotation damper to the frame of cooking device 100 as illustrated. Damper 308 limits the rate of relative rotation between hinge arm 26 and the frame of cooking device 100, so as to provide a safe and predictable rate of motion when lifting or lowering upper platen assembly 10 between the open and closed configurations.

Figure 20:
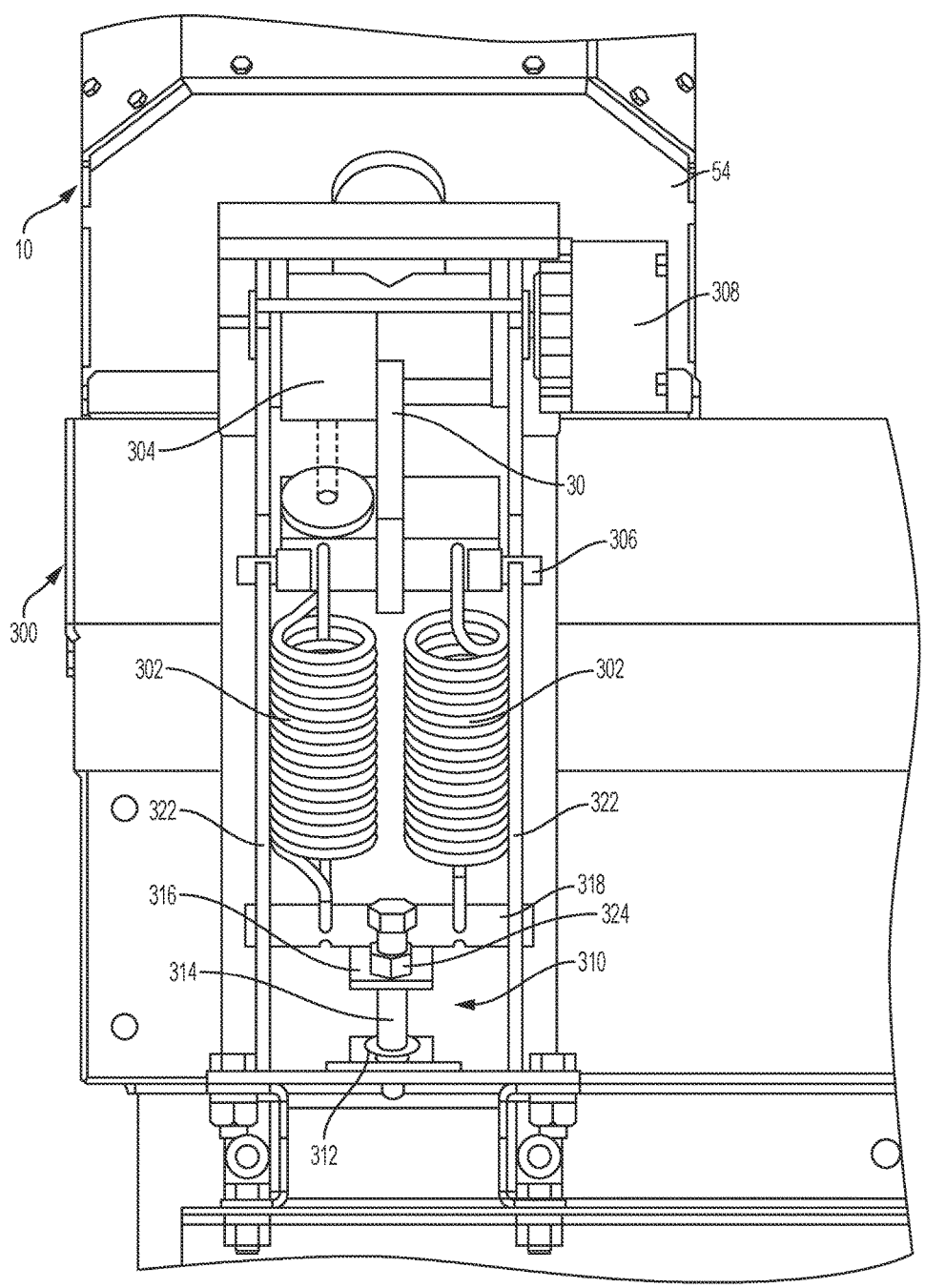
FIG. 20 is a rear, elevation view of the counterweight system shown in FIG. 16.

FIGS. 19 and 20 illustrate spring force adjuster assembly 310, which is operable to selectively "preload" springs 302 and thereby provide for variable force assist by springs 302 in lifting upper platen assembly 10. As illustrated, assembly 310 includes a fixed base 312 rigidly attached (e.g., by welding and/or fasteners) to the frame of cooking device 100. Extending upwardly from base 312 is an adjuster in the form of a threaded bolt or rod 314, which passes through an aperture in adjuster flange 316. Adjuster flange 316 is fixed (e.g., by welding or fasteners) to adjuster bar 318, which is fixed to springs 302 as best seen in FIG. 20. In the illustrated embodiment, adjuster bar 318 extends through slots 320 formed in side plates 322, which constrains the motion of bar 318 to its intended path.

Adjuster nut 324 is threadably engaged with bolt 314 and abuts adjuster flange 316, such that rotation of adjuster nut 324 in one direction causes flange 316 to be forced downwardly along bolt 314, pulling springs 302 against their biasing force into an extended configuration and increasing the counterweight force of springs 302 on counterweight extension 30 of hinge arm 26. Conversely, if adjuster nut 324 is rotated in the opposite direction, flange 316 is allowed to travel upwardly along bolt 314 under the biasing force of springs 302, shortening springs 302 and reducing their force on extension 30.

In operation, controller 78 (FIG. 11) can automatically open and close upper platen assembly 10 by energizing or de-energizing electromagnet 304. When controller energizes electromagnet 304, assembly 10 will be reconfigured from its open configuration to the closed configuration and/or held in the closed configuration. When controller de-energizes electromagnet 304, assembly 10 is allowed to pivot into, or remain in, the open configuration under the force of springs 302. Advantageously, operation of this system is technically simple, requiring only a single binary signal to the electromagnet (i.e., energize/do not energize) to effect automatic opening or closure of upper platen assembly 10.

In some exemplary embodiments, controller 78 may be programmed to automatically open upper platen assembly 10 in response to a "food cooking complete" signal which takes account of the food item being cooked, the time elapsed since cooking began, and the cooking parameters of cooking device 100 (e.g., gap size between cooking cover 14 and lower platen 12, heat energy applied, temperature maintained, humidity/steam amounts, etc.).

6. Alternative Vertical Adjustment Mechanisms

Figure 4:
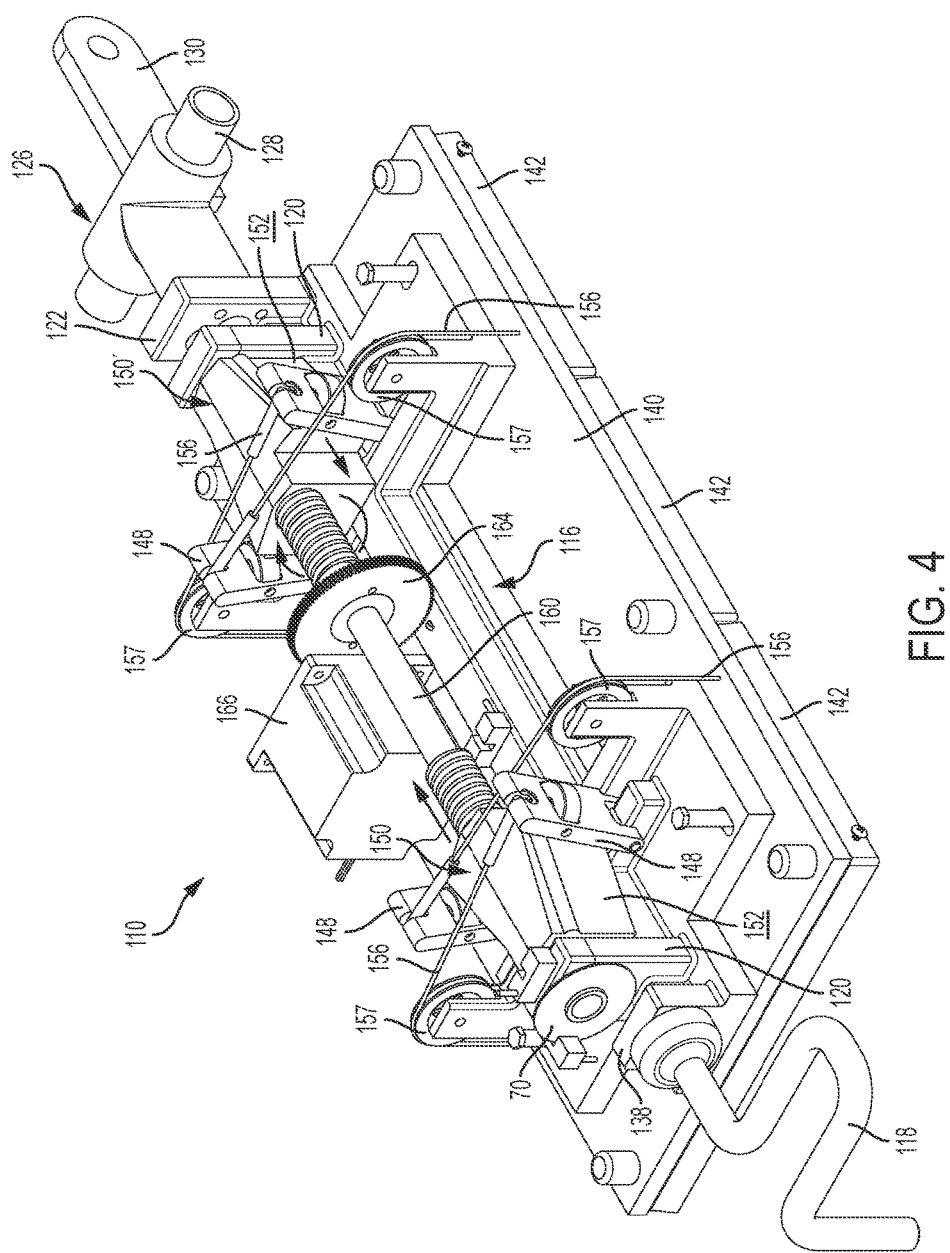
FIG. 4 is perspective view of another upper platen assembly made in accordance with the present disclosure, illustrating vertically adjustable heaters in a fully raised configuration.
Figure 5:
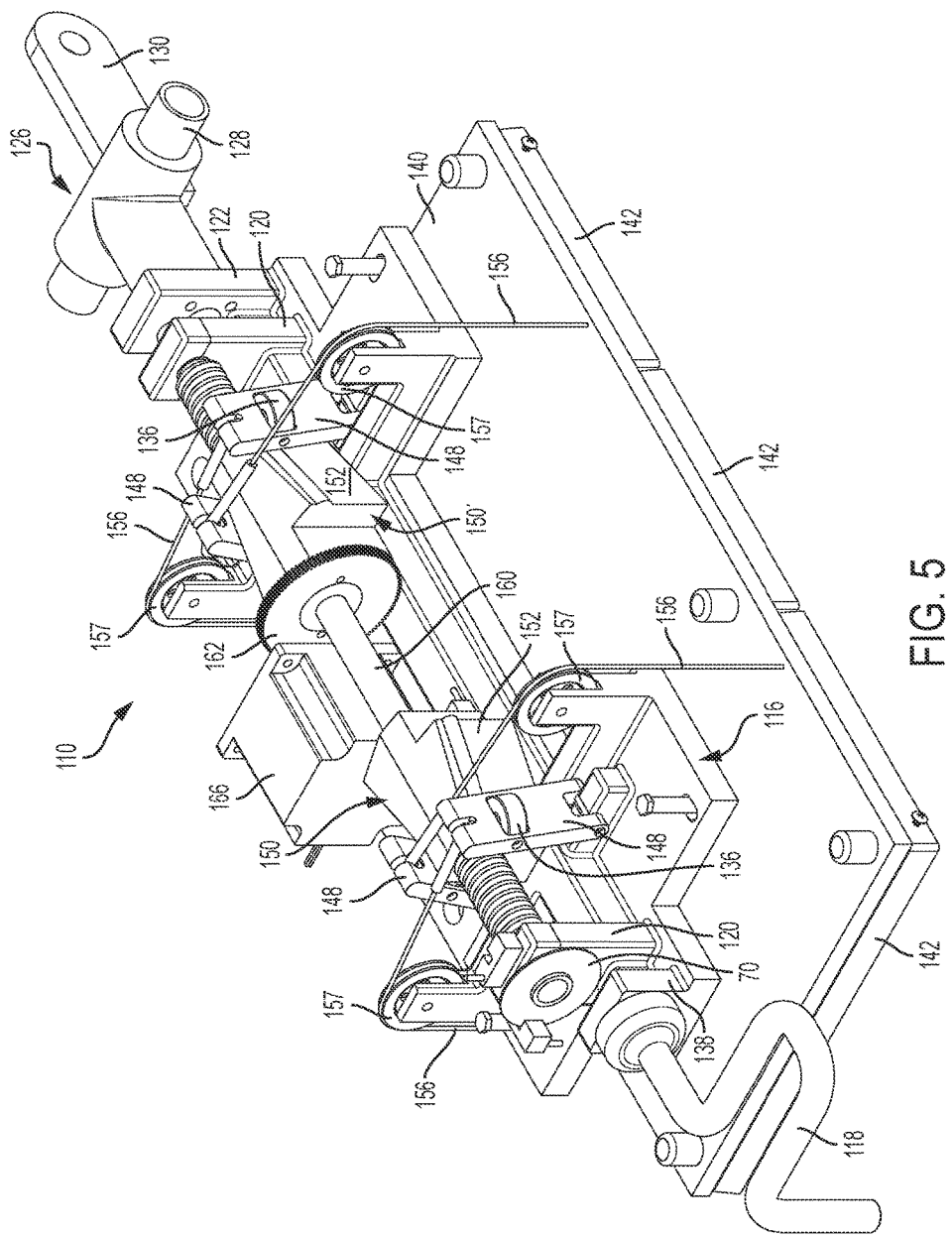
FIG. 5 is another perspective view of the upper platen assembly shown in FIG. 4, illustrating the heaters in a fully lowered configuration.
Figure 6:
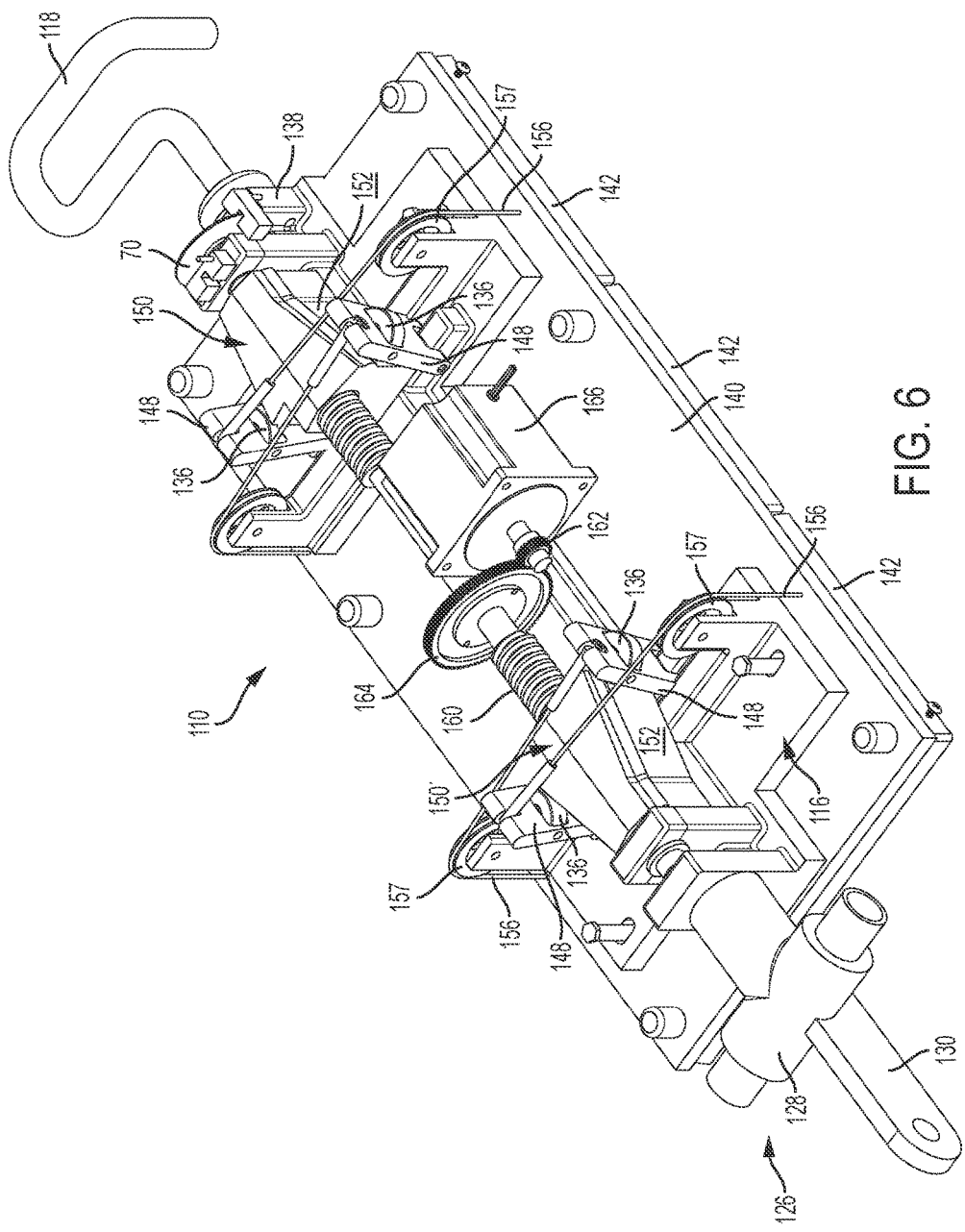
FIG. 6 is another perspective view of the upper platen assembly shown in FIG. 4, taken from a rear, pivot side of the assembly.

FIGS. 4-6 show an alternative vertical adjustment mechanism useable in conjunction with upper platen assembly 110. Upper platen assembly 110 utilizes similar design features and operational principles as upper platen assembly 10 described above, and corresponding structures and features of upper platen assembly 110 have corresponding reference numerals to upper platen assembly 10, except with 100 added thereto. However, upper platen assembly 110 uses wedges 150, 150' with ramped surfaces 152 which face laterally outwardly, rather than upwardly as in the case of ramped surfaces 52 described above.

Motor 166, lead screw 160 and gears 162, 164 all operate the same as their analogous components in assembly 10, selectively drawing wedges 150, 150' toward one another or advancing wedges 150, 150' away from one another along the axial extent of lead screw 160. In the illustrated embodiment, external 70 is fixed to the proximal end of lead screw 160 instead of the internal motor-based encoder of assembly 10.

Cross members 148 are pivotably attached to mainstay 116 and extend substantially vertically, rather than laterally across wedges 150, 150'. The upper end each cross member 148 has lifting cable 156 fixed thereto, which extends laterally across the adjacent wedge 150 or 150' and around a respective pulley 157. After making the turn around pulley 157, cable 156 extends downwardly through insulation 140 and is affixed to heaters 142.

As lead screw 160 rotates and linearly translates wedges 150, 150' between the raised position (FIGS. 4 and 6) and the lowered position (FIG. 5), cross members 148 pivot from a raised configuration, in which cross members 148 are splayed outwardly by the wide portions of wedges 150, 150', to a lowered configuration, in which cross members 148 are inwardly convergent as they engage narrow portions of wedges 150, 150'. During vertical adjustment, the weight of heaters 142 (and a cover, not shown, similar to cover 54) keeps cables 156 tensioned and maintains contact between respective cross members 148 and wedges 150 or 150' via roller bearings 136.

As the width of wedges 150 or 150' increases at the point of contact with cross members 148 (i.e., by outward translation of wedges 150 or 150'), cables 156 are drawn upwardly and thereby raise insulation 140 and heater 142. Conversely, as the width of wedges 150 or 150' decreases at the point of contact with cross members 148 (i.e., by outward translation of wedges 150 or 150'), cables 156 are drawn allowed to move downwardly and thereby lower insulation 140 and heater 142.

Figure 7:
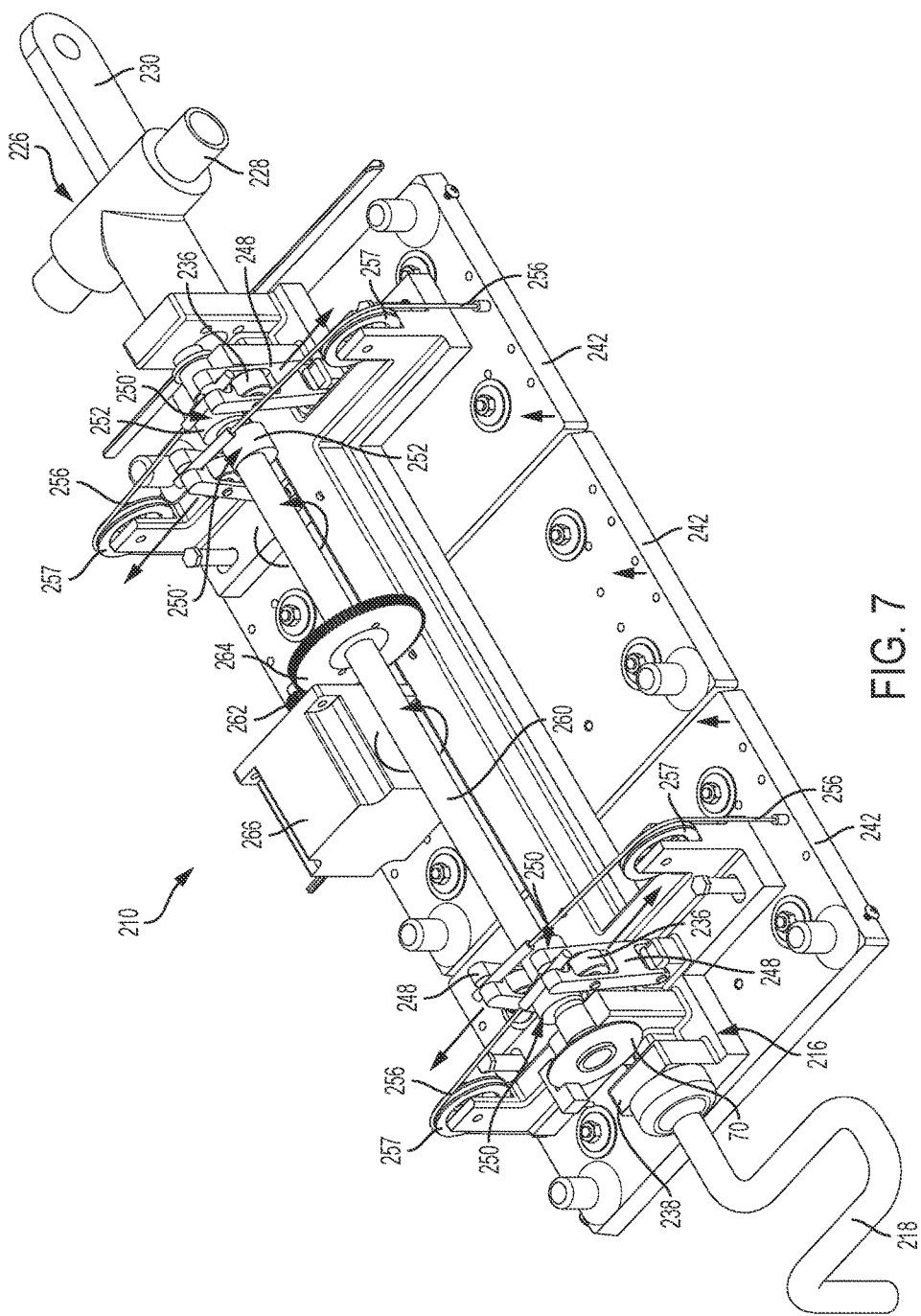
FIG. 7 is perspective view of another upper platen assembly made in accordance with the present disclosure, illustrating vertically adjustable heaters in a fully lowered configuration.
Figure 8:
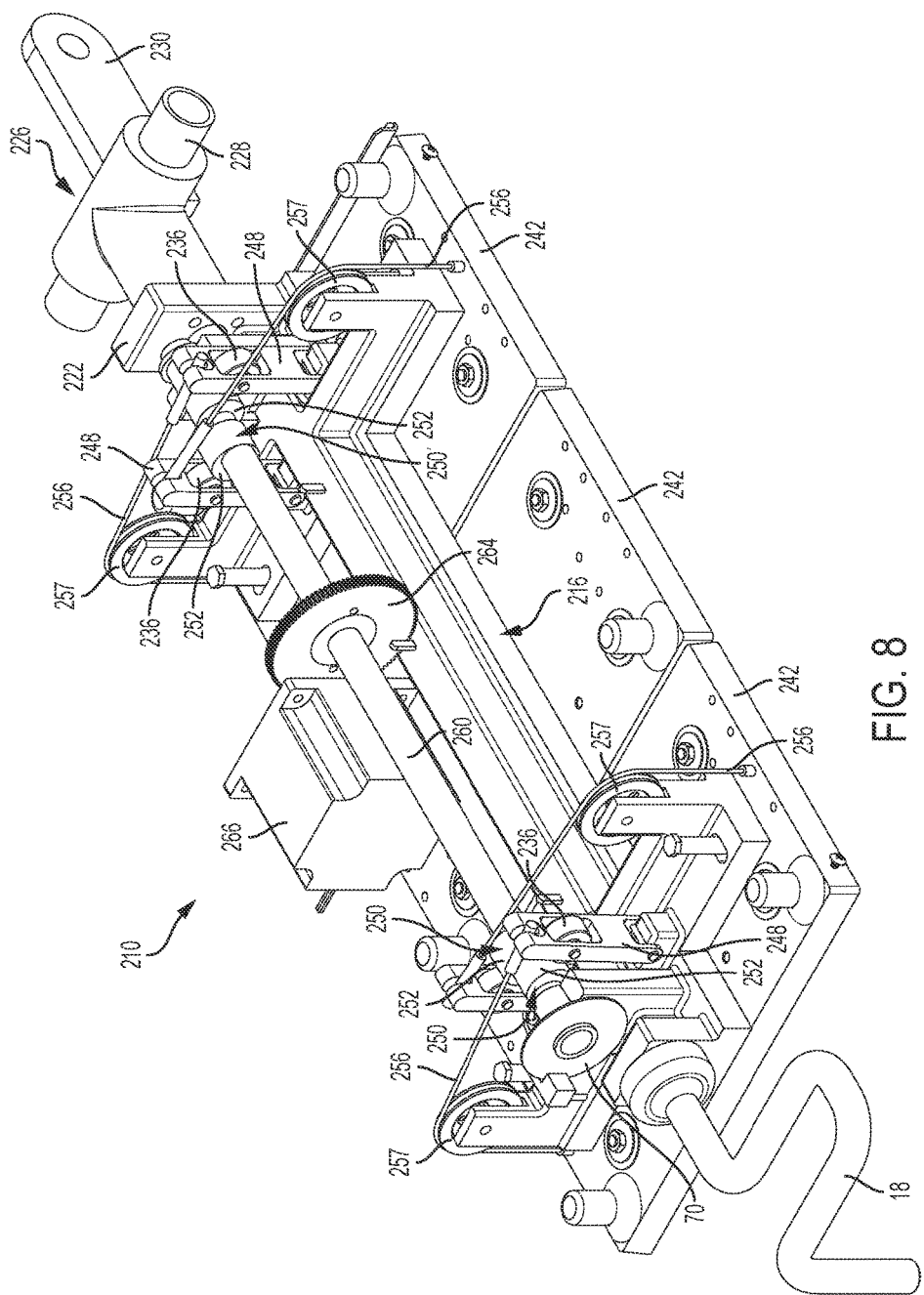
FIG. 8 is another perspective view of the upper platen assembly shown in FIG. 7, illustrating the heaters in a fully raised configuration.
Figure 9:
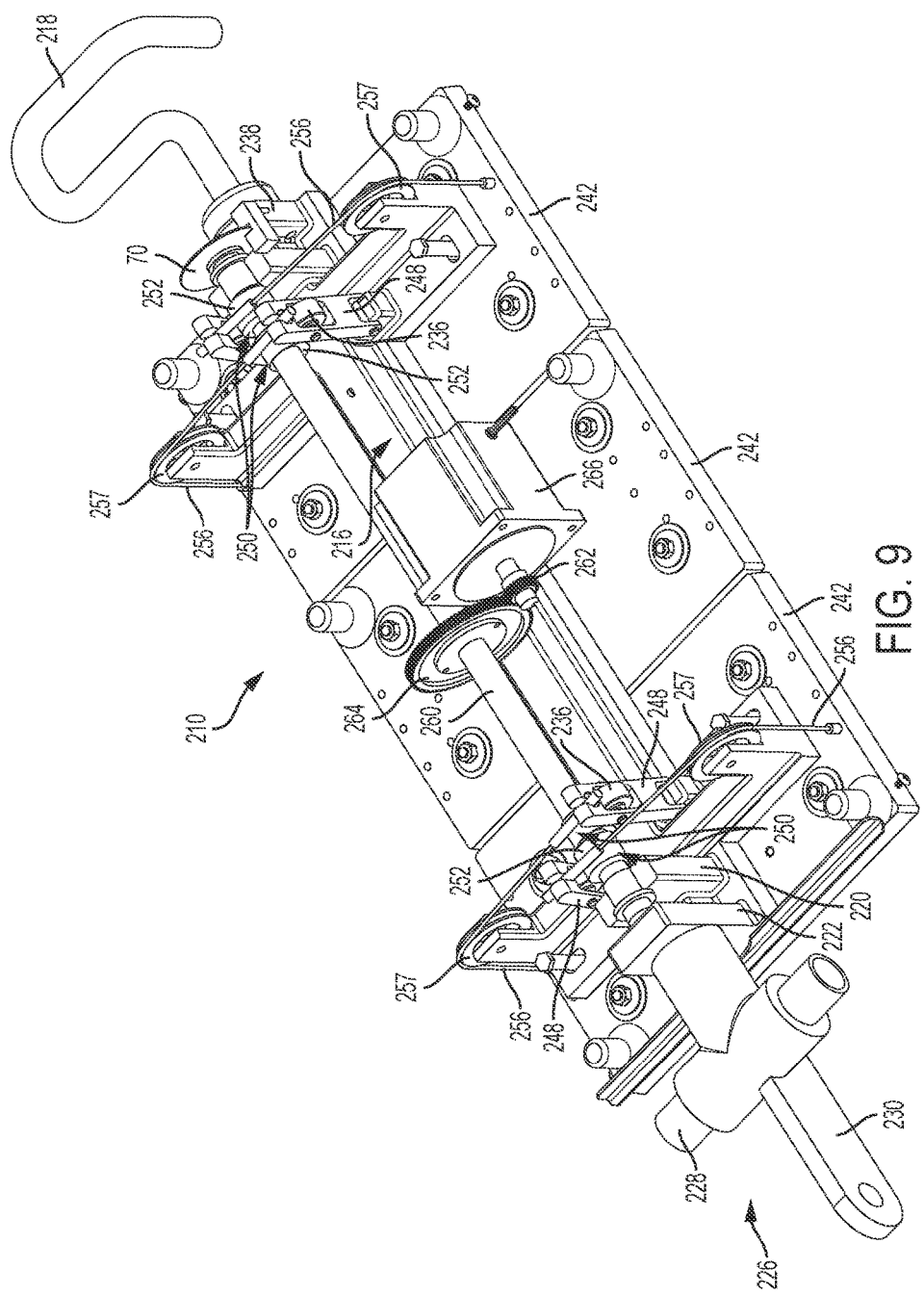
FIG. 9 is another perspective view of the upper platen assembly shown in FIG. 7, taken from a rear, pivot side of the assembly.

FIGS. 7-9 show an alternative vertical adjustment mechanism useable in conjunction with upper platen assembly 210. Upper platen assembly 210 utilizes similar design features and operational principles as upper platen assembly 10 described above, and corresponding structures and features of upper platen assembly 210 have corresponding reference numerals to upper platen assembly 10, except with 200 added thereto. However, upper platen assembly 210 uses cams 250, 250' with cam lobes 252 which rotate into engagement with cross members 248, rather than using ramped surfaces as described above with respect to assemblies 10 and 110.

Cross members 248 are similarly arranged to cross members 148 of assembly 110, in that cross members 248 are pivotably mounted to mainstay 216 and are operable to reconfigure from a splayed-outwardly configuration (when heaters 242 are in the raised position as shown in FIG. 9) and an inwardly-convergent configuration (when heaters 242 are in the lowered configuration as shown in FIGS. 7 and 9).

However, upper platen assembly 210 uses cams 250, 250' in place of wedges, and actuates cross members 248 outwardly by rotating drive shaft 260 to bring eccentric lobes 252 into engagement with cross members 248 via roller bearings 236. Because drive shaft 260 need not make a full rotation in either direction to effect actuation, assembly 210 does not use a lead screw and therefore may use other mechanical reductions such as through input and output gears 262, 264 (FIG. 9).

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A vertically adjustable upper platen assembly for a cooking appliance, the upper platen assembly comprising:
   a mainstay;
   at least one heater moveably coupled to the mainstay, the heater moveable into a plurality of vertical positions between a raised configuration in which the at least one heater is adjacent the mainstay, and a lowered configuration in which the at least one heater is spaced from the mainstay;
   a motor fixed to the mainstay and functionally coupled to the at least one heater via a plurality of mechanical reductions, whereby the motor provides precise adjustment of the plurality of vertical positions;
   the plurality of mechanical reductions comprising:
      a lead screw drivingly coupled to the motor;
      a wedge threadably engaged with the lead screw such that the wedge linearly translates along the lead screw when the lead screw is driven by the motor, the wedge having a ramped surface; and
      a cross member slidingly disposed on the ramped surface and having the at least one heater vertically suspended therefrom,
   wherein rotation of the lead screw translates the wedge with respect to the cross member such that the cross member moves vertically by interaction with the ramped surface.

2. The upper platen assembly of claim 1, wherein:
   a thread pitch of the lead screw comprises a first one of the plurality of mechanical reductions; and
   a slope of the ramped surface comprises a second one of the plurality of mechanical reductions.

3. The upper platen assembly of claim 2, further comprising:
   an input gear fixed to a mandrel of the motor; and
   an output gear drivingly engaged with the input gear and fixed to the lead screw, the output gear larger than the input gear such that the input gear and the output gear cooperate to comprise a third one of the plurality of mechanical reductions.

4. The upper platen assembly of claim 1, further comprising a controller operatively connected to the motor, the controller configured to receive an input indicative of a desired vertical position of the at least one heater, the controller programmed to actuate the motor to rotate the lead screw a number of turns to place the at least one heater in the desired vertical position.

5. The upper platen assembly of claim 4, further comprising:
   an upper limit sensor configured and positioned to be actuated by at least one of the wedge and the cross member when the at least one heater is in the raised configuration, the upper limit sensor sending a signal to the controller to prevent further actuation of the motor to raise the at least one heater when the at least one heater is in the raised configuration; and
   a lower limit sensor configured and positioned to be actuated by at least one of the wedge and the cross member when the at least one heater is in the lowered configuration, the lower limit sensor sending a signal to the controller to prevent further actuation of the motor to raise lower the at least one heater when the at least one heater is in the lowered configuration.

6. The upper platen assembly of claim 1, in combination with the cooking appliance, the cooking appliance further comprising:
   a lower platen having a lower platen cooking surface opposed to and spaced from an upper platen cooking surface adjacent the at least one heater, the space between the upper and lower platen cooking surfaces defining a cooking space having a variable size depending on the vertical configuration of the upper platen assembly.

7. The cooking appliance of claim 6, wherein:
   the upper platen assembly is pivotable between a closed configuration defining the cooking space between the opposed upper and lower cooking surfaces, and an open configuration in which the at least one heater is pivoted away from and non-parallel to the lower platen,
   the mainstay includes a hinge arm extending distally from a distal portion of the mainstay, the hinge arm including a hinge rotatably attachable to the lower platen and a counterweight extension extending distally from the hinge,
   the cooking appliance further comprising a counterweight coupled to the counterweight extension and urging the counterweight extension downwardly.

8. The upper platen assembly of claim 1, wherein:
   the ramped surface of the wedge faces upwardly away from the lead screw;
   the cross member extends transversely to a longitudinal axis of the lead screw;
   a plurality of tie rods having upper ends respectively coupled to each transverse end of the cross member and lower ends respectively coupled to the at least one heater, the tie rods vertically fixing the cross member to the at least one heater such that vertical movement of the cross member also vertically moves the at least one heater.

9. The upper platen assembly of claim 1, wherein:
   the ramped surface of the wedge faces laterally away from the lead screw;

the cross member extends substantially vertically;
a plurality of tie rods having upper ends respectively coupled to each transverse end of the cross member and lower ends respectively coupled to the at least one heater, the tie rods vertically fixing the cross member to the at least one heater such that vertical movement of the cross member also vertically moves the at least one heater.

10. The upper platen assembly of claim 1, further comprising:
a lower roller bearing rotatably coupled to the mainstay and supporting the wedge; and
an upper roller bearing rotatably coupled to the cross member and engaging the ramped surface.

11. The upper platen assembly of claim 1, further comprising a plurality of guide rods fixed to the mainstay, the guide rods vertically oriented and substantially parallel to one another, and slidingly coupled with the cross member.

12. A cooking appliance comprising:
a lower platen having a lower platen cooking surface; and
an upper platen assembly having an upper platen cooking surface opposed to and spaced from the lower platen cooking surface to define a vertical gap there between, the upper platen assembly comprising:
a mainstay;
an upper platen defining the upper platen cooking surface and moveably coupled to the mainstay, the upper platen moveable relative to the mainstay into a plurality of vertical positions between a raised configuration in which the vertical gap is at a maximum desired size, and a lowered configuration in which the vertical gap is at a minimum desired size;
a motor fixed to the mainstay and functionally coupled to the upper platen via a plurality of mechanical reductions, such that one full rotation of the motor adjusts a size of the vertical gap by between 0.0005-inches and 0.007-inches;
the plurality of mechanical reductions comprising:
a lead screw drivingly coupled to the motor;
a wedge threadably engaged with the lead screw such that the wedge linearly translates along the lead screw when the lead screw is driven by the motor, the wedge having a ramped surface; and
a cross member slidingly disposed on the ramped surface and having the upper platen vertically suspended therefrom,
wherein rotation of the lead screw translates the wedge with respect to the cross member such that the cross member moves vertically by interaction with the ramped surface.

13. The cooking appliance of claim 12, wherein:
a thread pitch of the lead screw comprises a first one of the plurality of mechanical reductions; and
a slope of the ramped surface comprises a second one of the plurality of mechanical reductions.

14. The cooking appliance of claim 13, wherein the upper platen assembly further comprising:
an input gear fixed to a mandrel of the motor; and
an output gear drivingly engaged with the input gear and fixed to the lead screw, the output gear larger than the input gear such that the input gear and the output gear cooperate to comprise a third one of the plurality of mechanical reductions.

15. The cooking appliance of claim 12, wherein the upper platen assembly further comprising:
at least one heater moveably coupled to the mainstay, the heater moveable with the upper platen between the raised configuration in which the at least one heater is adjacent the mainstay, and the lowered configuration in which the at least one heater is spaced from the mainstay.

16. A cooking appliance comprising:
a lower platen having a lower platen cooking surface; and
an upper platen assembly having an upper platen cooking surface opposed to and spaced from the lower platen cooking surface to define a vertical gap therebetween, the upper platen assembly comprising:
a mainstay;
a cross member vertically moveable with respect to the mainstay into a raised position and a lowered position, the cross member extending laterally outwardly away from the mainstay and having a bore formed vertically therethrough at a lateral outward end portion of the cross member;
a tie rod coupled to the cross member at the bore;
at least one heater vertically suspended from the cross member by the tie rod, such that the at least one heater is vertically moveable with the cross member;
a leveler assembly disposed at a junction between the cross member and the tie rod, the leveler assembly comprising:
a latch lever having an aperture, an actuator positioned laterally inward of the aperture, and a pivot portion positioned laterally outward of the aperture; and
a sleeve extending through the bore of the cross member with a first clearance such that a longitudinal axis of the sleeve is fixed in a substantially coaxial relationship with a longitudinal axis of the bore, the sleeve also extending through the aperture of the latch lever with a second clearance larger than the first clearance, such that the longitudinal axis of the aperture of the latch lever is skewable with respect to a longitudinal axis of the sleeve,
the actuator of the latch lever biased into a downwardly pivoted position when the cross member is in the raised position, such that the aperture of the latch lever is skewed into a frictionally fixed contact with the sleeve, and
the actuator of the latch lever urged into an upwardly pivoted position when the cross member is in the lowered position, such that the sleeve is sufficiently frictionally disengaged with the aperture of the latch lever to allow axial movement of the sleeve with respect to the latch lever and the cross member.

17. The cooking appliance of claim 16, wherein:
a pair of the cross members is provided in spaced apart relationship and each of the cross members includes a pair of the tie rods fixed to each lateral end thereof, and one of the leveler assembly is provided at each junction between respective tie rods and cross members.

18. The cooking appliance of claim 16, further comprising:
an upper spring compressed between an upper surface of the cross member and a flange formed on the sleeve, such that the upper spring is positioned and configured to urge the flange of the sleeve upwardly away from the cross member.

19. The cooking appliance of claim 16, further comprising:
a lower clutching spring compressed between a lower surface of the cross member and an adjacent upper surface of the latch lever, and positioned laterally inwardly of the pivot portion of the latch lever such that the lower clutching spring urges the latch lever into the downwardly pivoted position.

20. The cooking appliance of claim 19, further comprising:
a latch ramp having a ramped surface positioned to engage the actuator of the latch lever to urge the latch lever toward the upwardly pivoted position against the biasing force of the lower clutching spring as the cross member approaches its lowered configuration.

21. The cooking appliance of claim 16, wherein the upper platen assembly further comprises:
a motor fixed to the mainstay and functionally coupled to the at least one heater via a plurality of mechanical reductions comprising;
a lead screw drivingly coupled to the motor; and
a wedge threadably engaged with the lead screw such that the wedge linearly translates along the lead screw when the lead screw is driven by the motor, the wedge having a ramped surface;
wherein rotation of the lead screw translates the wedge with respect to the cross member such that the cross member moves vertically by interaction with the ramped surface of the wedge.

22. A cooking appliance comprising:
a lower platen having a lower platen cooking surface; and
an upper platen assembly having an upper platen cooking surface, the upper platen assembly defining a closed configuration in which the upper platen cooking surface is opposed to and spaced from the lower platen cooking surface to define a vertical gap therebetween, and an open configuration in which the upper platen assembly is pivoted away from the lower platen, the upper platen assembly comprising:
a hinge rotatably connected to the lower platen;
an upper platen extending proximally from the hinge; and
a counterweight extension extending distally from the hinge; and
a counterweight system comprising:
a linear actuator comprising at least one extension spring fixed to the lower platen and coupled to the counterweight extension, the linear actuator providing a downward force on the counterweight extension sufficient to pivot the upper platen assembly from the closed configuration to the open configuration; and
an electric actuator comprising an electromagnet fixed to the lower platen and coupled to the counterweight extension, the electric actuator providing an upward force on the counterweight extension sufficient to urge the upper platen assembly toward the closed configuration in opposition to the downward force of the linear actuator.

23. The cooking appliance of claim 22, wherein the linear actuator comprises at least one extension spring having a fully compressed configuration and a force-transferring extended configuration, the counterweight system further comprising a limit pin fixed to the lower platen and positioned to limit rotation of the upper platen assembly toward the open configuration to a position in which the at least one extension spring retains the force-transferring extended configuration when the upper platen assembly is in the open configuration.

24. A cooking appliance comprising:
a lower platen having a lower platen cooking surface; and
an upper platen assembly having an upper platen cooking surface, the upper platen assembly defining a closed configuration in which the upper platen cooking surface is opposed to and spaced from the lower platen cooking surface to define a vertical gap therebetween, and an open configuration in which the upper platen assembly is pivoted away from the lower platen, the upper platen assembly comprising:
a hinge rotatably connected to the lower platen;
an upper platen extending proximally from the hinge; and
a counterweight extension extending distally from the hinge; and
a counterweight system comprising:
a linear actuator comprising at least one extension spring fixed to the lower platen and coupled to the counterweight extension, the linear actuator providing a downward force on the counterweight extension sufficient to pivot the upper platen assembly from the closed configuration to the open configuration;
an electric actuator fixed to the lower platen and coupled to the counterweight extension, the electric actuator providing an upward force on the counterweight extension sufficient to urge the upper platen assembly toward the closed configuration in opposition to the downward force of the linear actuator; and
a spring force adjuster assembly comprising:
a base fixed to the lower platen; and
an adjuster having a first end moveably attached to the base and a second, opposing end attached to the at least one extension spring, the adjuster linearly adjustable to lengthen or shorten a distance between the base and the at least one extension spring such that the at least one extension spring may be selectively preloaded.

25. A cooking appliance comprising:
a lower platen having a lower platen cooking surface; and
an upper platen assembly having an upper platen cooking surface, the upper platen assembly defining a closed configuration in which the upper platen cooking surface is opposed to and spaced from the lower platen cooking surface to define a vertical gap therebetween, and an open configuration in which the upper platen assembly is pivoted away from the lower platen, the upper platen assembly comprising:
a hinge rotatably connected to the lower platen;
an upper platen extending proximally from the hinge;
a counterweight extension extending distally from the hinge; and
a damper operatively coupled to the hinge to limit the rate of relative rotation between the upper platen assembly and the lower platen; and
a counterweight system comprising:
a linear actuator fixed to the lower platen and coupled to the counterweight extension, the linear actuator providing a downward force on the counterweight extension sufficient to pivot the upper platen assembly from the closed configuration to the open configuration; and
an electric actuator fixed to the lower platen and coupled to the counterweight extension, the electric actuator providing an upward force on the counterweight extension sufficient to urge the upper platen assembly toward the closed configuration in opposition to the downward force of the linear actuator.

* * * * *

UNITED STATES PATENT AND TRADEMARK OFFICE
CERTIFICATE OF CORRECTION

PATENT NO. : 10,376,097 B1
APPLICATION NO. : 14/988612
DATED : August 13, 2019
INVENTOR(S) : Seitz Page 1 of 1

It is certified that error appears in the above-identified patent and that said Letters Patent is hereby corrected as shown below:

In the Claims

Claim 5, Column 16, Line 27, before "lower" delete "raise"

Signed and Sealed this
Twenty-second Day of October, 2019

Andrei Iancu
*Director of the United States Patent and Trademark Office*